Nov. 14, 1967  G. W. MORSE  3,352,229
HAY WAFER AND METHOD AND APPARATUS FOR MANUFACTURE
Filed Sept. 7, 1965  10 Sheets-Sheet 2

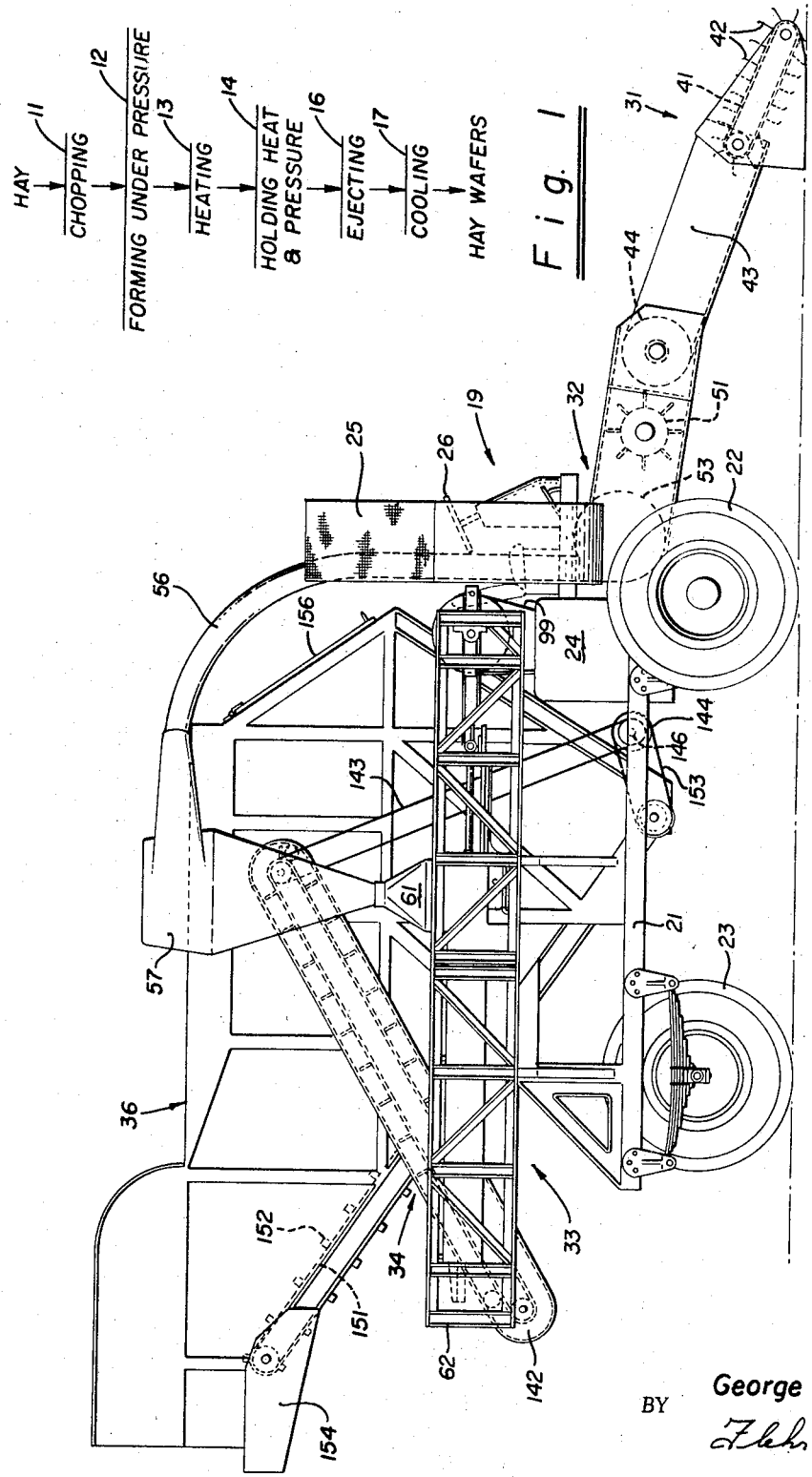

INVENTOR.
George W. Morse
BY
Attorneys

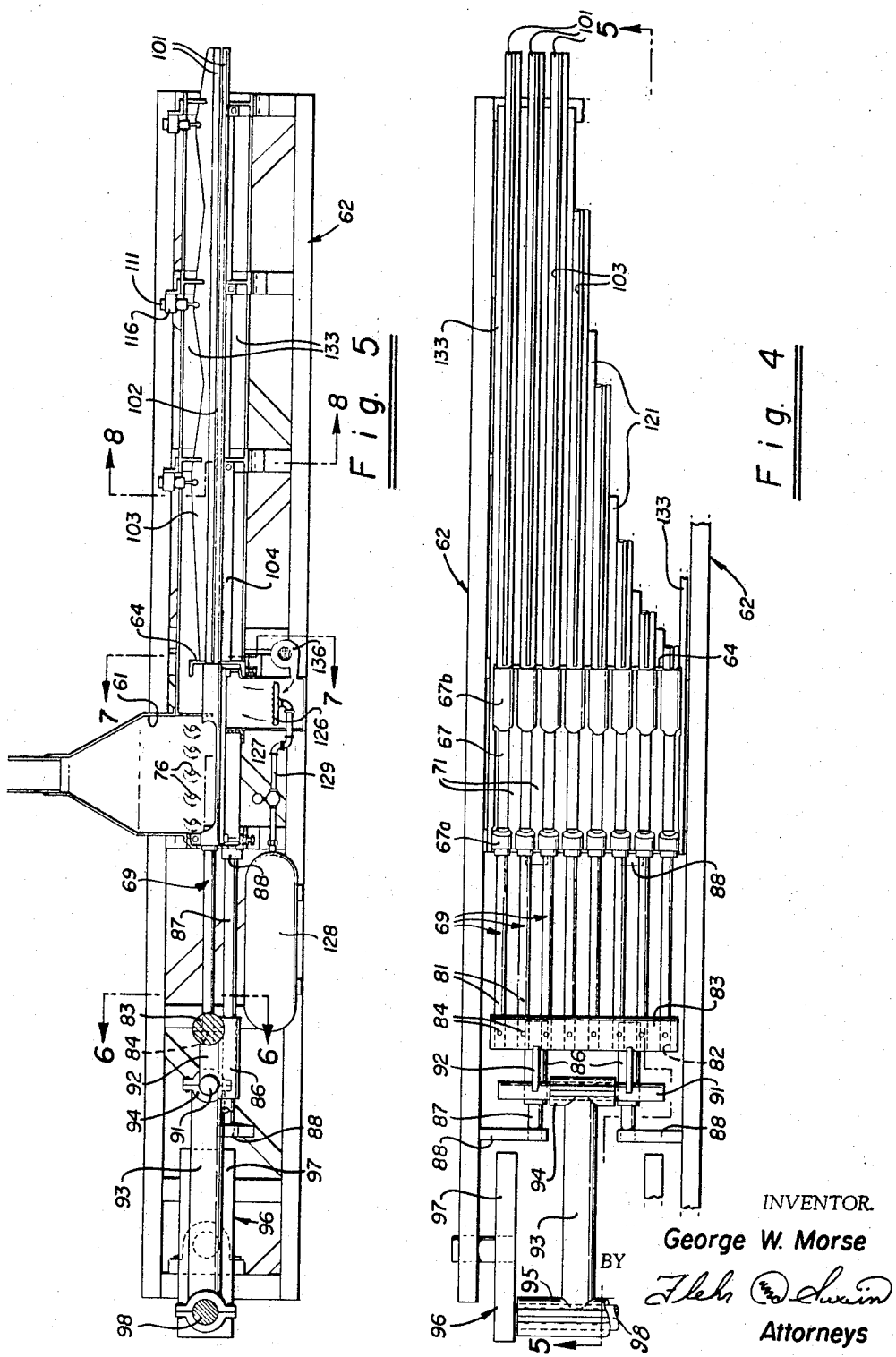

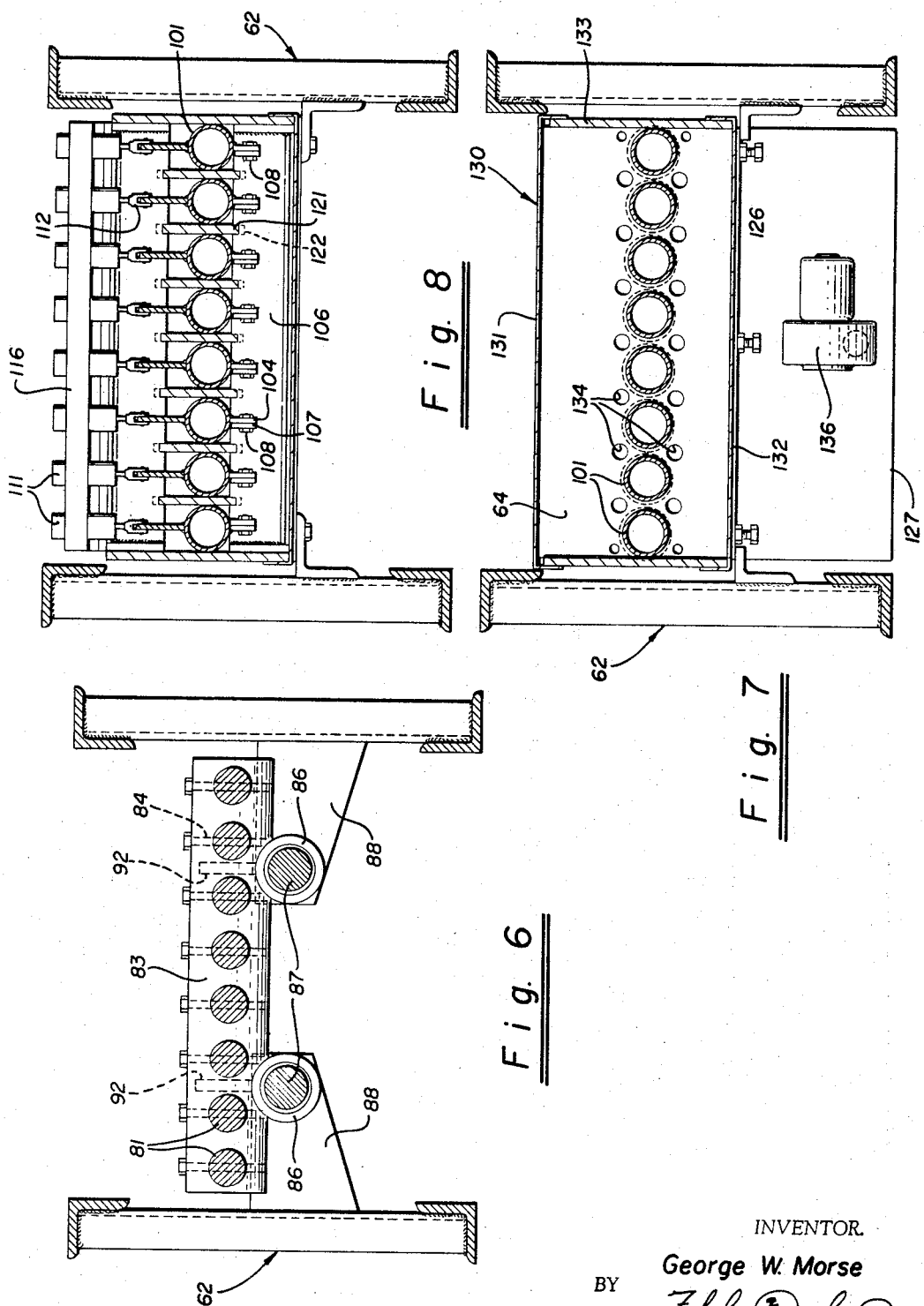

Nov. 14, 1967   G. W. MORSE   3,352,229
HAY WAFER AND METHOD AND APPARATUS FOR MANUFACTURE
Filed Sept. 7, 1965   10 Sheets-Sheet 5

INVENTOR.
George W. Morse
BY
Attorneys

Nov. 14, 1967  G. W. MORSE  3,352,229
HAY WAFER AND METHOD AND APPARATUS FOR MANUFACTURE
Filed Sept. 7, 1965  10 Sheets-Sheet 7
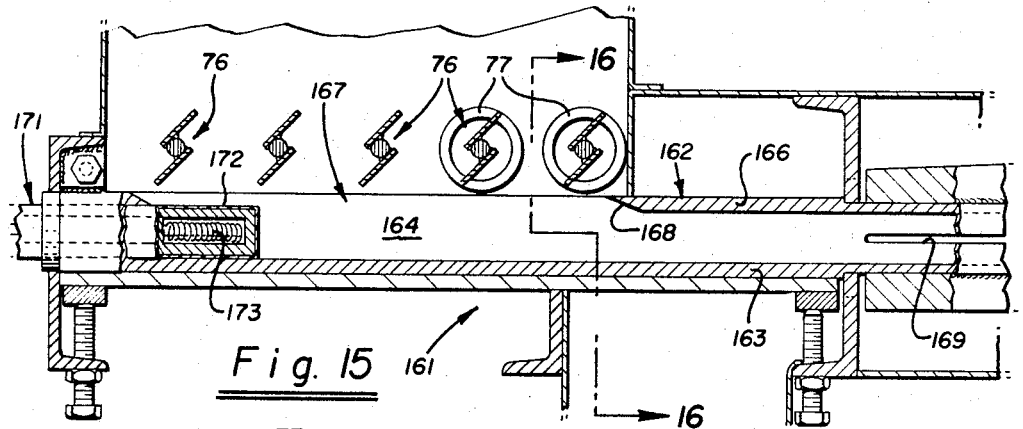
Fig. 15
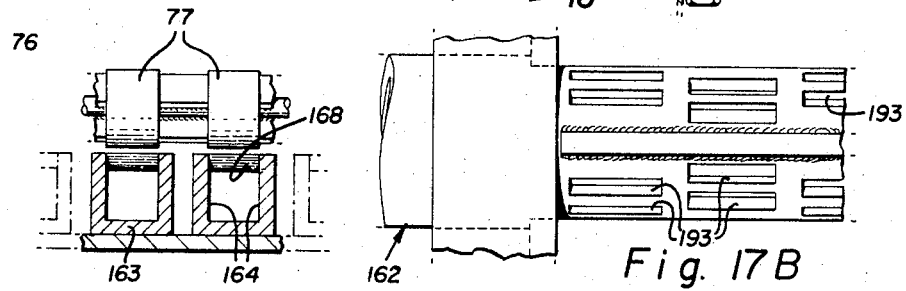
Fig. 16
Fig. 17B
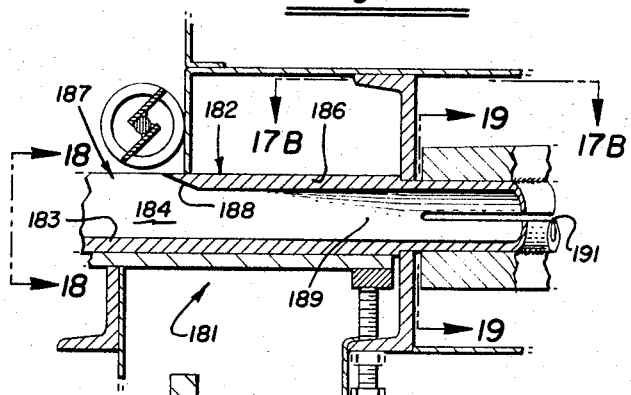
Fig. 17A
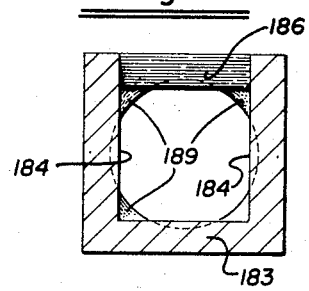
Fig. 18
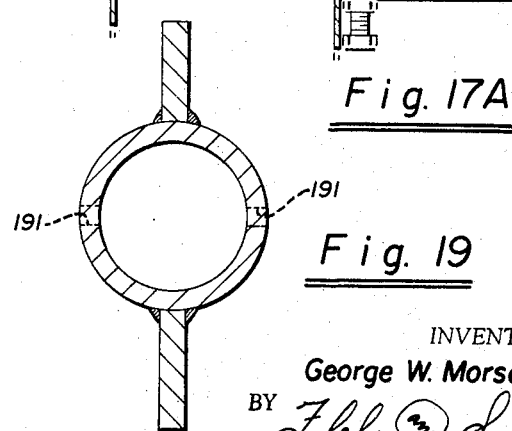
Fig. 19
INVENTOR.
George W. Morse
BY
Attorneys

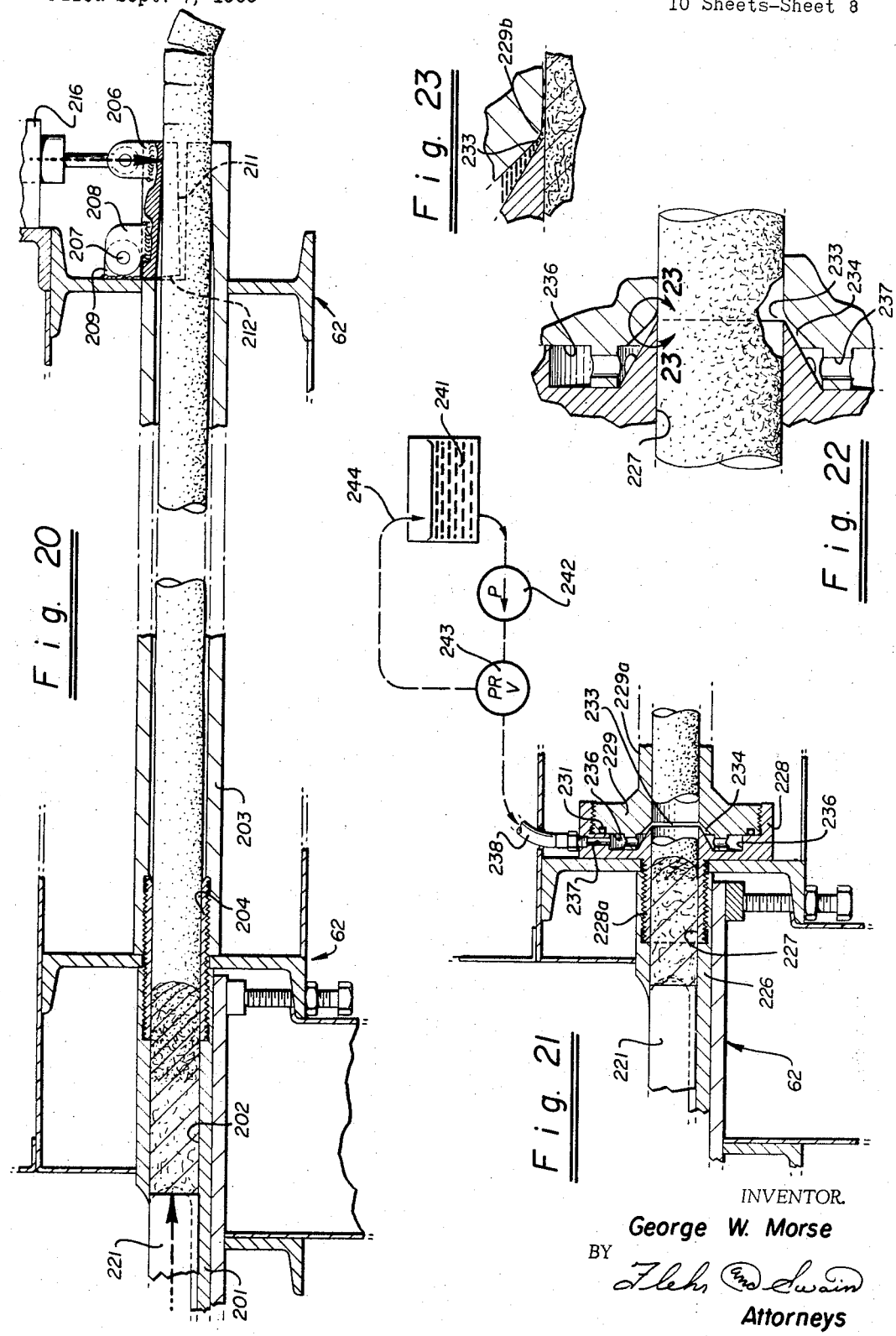

Nov. 14, 1967  G. W. MORSE  3,352,229
HAY WAFER AND METHOD AND APPARATUS FOR MANUFACTURE
Filed Sept. 7, 1965  10 Sheets-Sheet 9

INVENTOR.
George W. Morse
BY
Attorneys

Nov. 14, 1967  G. W. MORSE  3,352,229
HAY WAFER AND METHOD AND APPARATUS FOR MANUFACTURE
Filed Sept. 7, 1965  10 Sheets-Sheet 10

INVENTOR.
George W. Morse
BY
Attorneys

United States Patent Office 3,352,229
Patented Nov. 14, 1967

3,352,229
HAY WAFER AND METHOD AND APPARATUS
FOR MANUFACTURE
George W. Morse, Eschinger and Carroll Roads, Rte. 1,
Box 1529, Elk Grove, Calif. 95624
Filed Sept. 7, 1965, Ser. No. 485,214
24 Claims. (Cl. 100—38)

ABSTRACT OF THE DISCLOSURE

Hay wafering apparatus and method utilizing heat to substantially reduce the power requirement.

---

This application is a continuation-in-part of my application Ser. No. 212,700, filed July 26, 1962, now abandoned, and Ser. No. 224,812, filed Sept. 19, 1962, now abandoned.

This invention relates generally to hay wafers or pellets suitable for use as animal feed, to the method or process for the manufacture of the same, and to the apparatus used in the method or process for the manufacture of the hay wafer.

There is a continuing demand for improved methods and processes or processes and apparatus which can be utilized for hay pelleting or wafering. The problems involved in the storing, handling and feeding of bulk hay and baled hay are well known.

Present attempts to produce a commercially satisfactory method or process and apparatus for hay wafering have been relatively unsuccessful. The pelleting or wafering of hay is utilized to package the hay in a dense free flowing form that can be handled, transported and stored in bulk. Pelleted hay is made by first finely grinding the hay and then subsequently pelleting the finely ground hay which has the best density and handling characteristics but lacks the course rougage necessary for ruminants. Normally, the hay which is to be ground must be very dry. This requires subjecting the hay to long periods of drying in the field with the resultant leaching of nutrient values from the hay. Alternatively this required a separate dehydrating operation. Attempts to produce wafers from relatively coarse or chopped hay have not been completely satisfactory because of the large horsepower required for each ton of wafers produced and also because of the very heavy, bulky and expensive machinery which is required to produce the very high pressures presently required for making the wafers. Also, in one approach, it has been found that too much moisture must be added during the wafering process so that the wafers have a tendency to mold in open storage. It, therefore, can be seen that there is a need for a new and improved hay wafer together with a new and improved method and apparatus for manufacturing the same.

In general, it is an object of the present invention to provide a hay wafer which has a moisture content which is such that the wafer will keep in open storage.

Another object of this invention is to provide a hay wafer which is relatively dense and which has good handling characteristics.

Another object of the invention is to provide a hay wafer of the above character which is relatively durable.

Another object of the invention is to provide a hay wafer of the above character which is comprised essentially of compacted stem and leaf fragments of dried hay.

Another object of the invention is to provide a hay wafer of the above character which can be easily broken up by the animal and yet provide the coarse roughage which is required by ruminant animals.

Another object of the invention is to provide a hay wafer of the above character which is very palatable to feed animals.

Another object of the invention is to provide a hay wafer of the above character which has a low void ratio.

Another object of the invention is to provide a hay wafer of the above character which has a relatively high wafer density and a relatively high bulk density.

Another object of the invention is to provide a method or process for wafering hay which requires the use of relatively low pressures.

Another object of the invention is to provide a method or process of the above character in which heat is applied to the hay during the time the hay is being compressed into the wafer.

Another object of the invention is to provide a method of the above character which can be utilized with hay having relatively wide ranges in moisture content.

Another object of the invention is to provide a method of the above character which retains the nutrient values of the hay.

Another object of the invention is to provide a wafer of the above character which has a relatively stable configuration.

Another object of the invention is to provide a method of the above character in which a relatively uniform wafer is produced.

Another object of the invention is to provide a method of the above character which can utilize hay taken directly from the windrow in the field.

Another object of the invention is to provide apparatus for wafering hay which is relatively light and compact.

Another object of the invention is to provide apparatus of the above character which required relatively small amounts of power for operation of the same.

Another object of the invention is to provide apparatus of the above character which has a relatively low horsepower hour per ton wafer production rate.

Another object of the invention is to provide apparatus of the above character in which friction retarding movement of the wafers through the die is reduced to that needed to obtain adequate density.

Another object of the invention is to provide an apparatus of the above character in which the dies are shaped so that the lateral compression forces on the charge in the die are substantially reduced as the charge progresses through the die.

Another object of the invention is to provide an apparatus of the above character in which the frictional forces are reduced to a minimum by utilizing solely longitudinal compression rather than lateral and longitudinal compression for maintaining the configuration of the charge after it has been formed in the die.

Another object of the invention is to provide an apparatus of the above character in which water is applied to the exterior of the charge in the die.

Another object of the invention is to provide an apparatus of the above character which makes it possible to waferize hay having a relatively high internal moisture content.

Another object of the invention is to provide an apparatus of the above character in which a particularly novel feeding means is utilized.

Another object of the invention is to provide apparatus of the above character which is relatively simple in operation and which can be readily maintained.

Another object of the invention is to provide apparatus of the above character which is relatively simple to operate.

Additional objects and features of the invention will appear from the following description in which the preferred embodiments of the invention have been set forth in detail in conjunction with the accompanying drawings:

Referring to the drawings:

FIGURE 1 is a flow sheet illustrating one procedure for carrying out the present invention.

FIGURE 2 is a side elevational view, with certain parts in cross-section, of apparatus incorporating my invention for manufacturing hay wafers in accordance with the procedure shown in FIGURE 1.

FIGURE 4 is an enlarged partial plan view of the apparatus shown in FIGURE 3, with certain parts removed.

FIGURE 5 is a cross-sectional view taken along the line 5—5 of FIGURE 4.

FIGURE 6 is a cross-sectional view taken along the line 6—6 of FIGURE 5.

FIGURE 7 is a cross-sectional view taken along the line 7—7 of FIGURE 5.

FIGURE 8 is a cross-sectional view taken along the line 8—8 of FIGURE 5.

FIGURE 15 is a cross-sectional view with certain parts broken away of a modification of an extrusion assembly which can be utilized in my apparatus.

FIGURE 16 is a cross-sectional view taken along the line 16—16 of FIGURE 15.

FIGURES 17A and 17B are cross-sectional views with certain parts broken away of still another extrusion assembly which can be utilized in my apparatus for the manufacture of hay wafers.

FIGURE 18 is a cross-sectional view taken along the line 18—18 of FIGURE 17A.

FIGURE 19 is a cross-sectional view taken along the line 19—19 of FIGURE 17A.

FIGURE 20 is a side elevational view in cross-section of still another modification of an extrusion assembly which can be utilized in my apparatus.

FIGURE 21 is a partial side elevational view in cross-section of still another modification of an extrusion assembly which can be utilized in my apparatus.

FIGURE 22 is an enlarged detail view of a portion of the extrusion assembly shown in FIGURE 21.

FIGURE 23 is still greater enlargement of the portion of the apparatus encircled by the line 23—23 of FIGURE 22.

Figure 3:
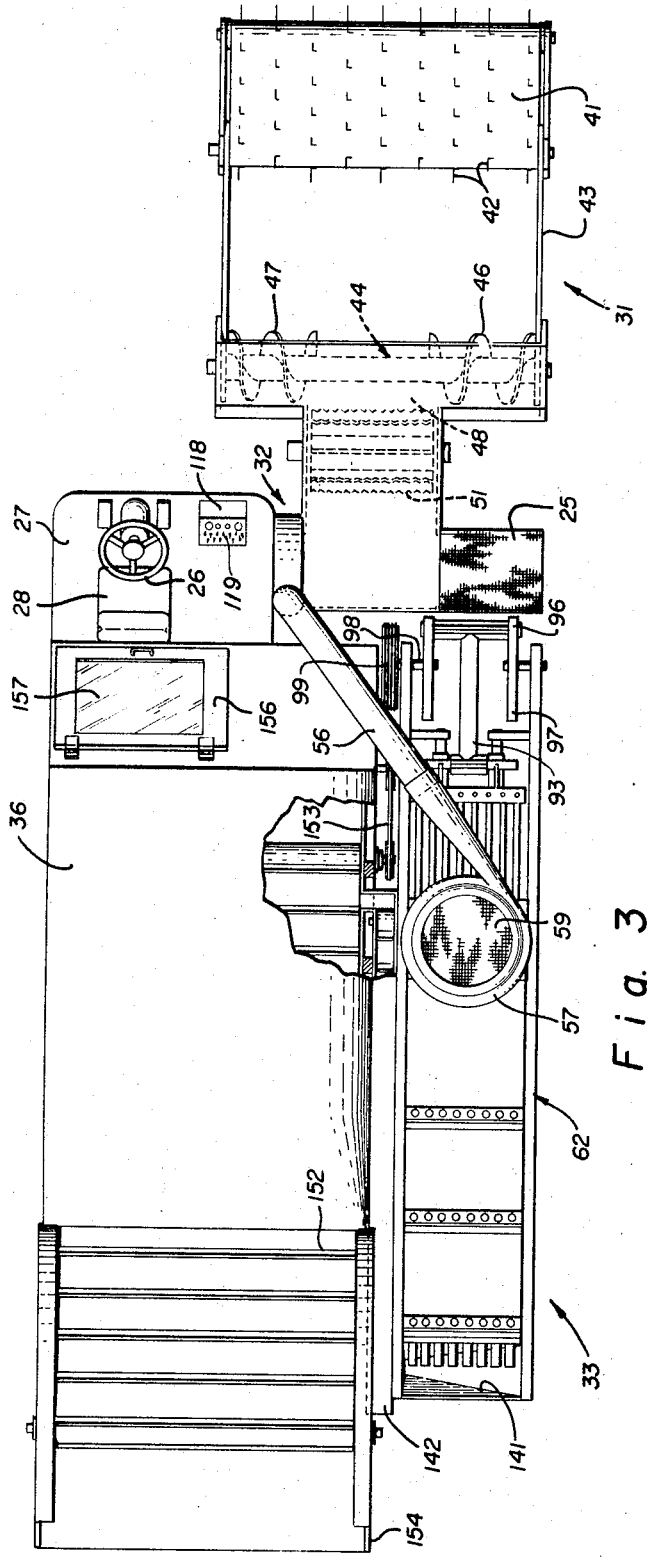
FIGURE 3 is a top plan view of the apparatus shown in FIGURE 2.
Figure 11:
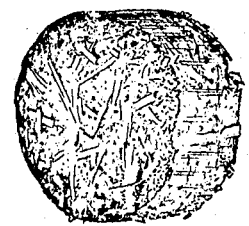
FIGURE 11 is an enlarged perspective view of a hay wafer made in accordance with the present invention.

The present invention involves the production of hay wafers from stem and leaf fragments of dried hay in which the dried hay is formed into the desired shape by the application of pressure. At the same time, heat is supplied to the hay fragments during the time that the pressure is being applied to the hay to vaporize any excess moisture in the hay and also to bond the stem and leaf fragments to assume and retain permanently flattened conditions so that there is provided a wafer which has relatively stable dimensions and which has good handling characteristics.

Referring first to the simplified flow diagram in FIGURE 1, I have shown a suitable source of hay such as that which is obtained by the cutting of grass, alfalfa, clover, which is dried and then supplied to the chopping operation 11. In order to make the best hay, the hay is normally cut at a predetermined time in its growth and at this time normally has a moisture content ranging from approximately 70 percent to 80 percent. Since this moisture content is too high for good keeping qualities, the hay is normally dried in the field or dried by artificial means so that it reaches an equilibrium moisture content by weight of approximately 10 percent to 18 percent. However, as hereinafter explained with my process, I have found that I can utilize hay ranging in moisture content from 5 percent to 20 percent without any difficulty.

In the chopping step 11, the hay is chopped or ground to form leaf and stem fragments of dried hay which are thoroughly intermixed, the bulk of which have a size greater than one inch and less than two inches. However, as hereinafter explained, my invention can be utilized with fragments or particles which are larger or smaller and, in fact, can even be utilized with finely ground or comminuted hay if it is desired to do so.

After the chopping operation 11 has been preformed, the leaf and stem fragments are supplied in charges to a forming operation 12 in which the leaf and stem fragments are compacted into the desired wafer or pellet form the utilization of pressure. At the same time or shortly thereafter, heat is supplied as shown by step 13 to the charge which has been formed into wafers and the heat and pressure are held on the wafer as shown in step 14 until the material has reached a temperature which is sufficient to drive out moisture from the stem and leaf fragments so that the total moisture content of a least the periphery of the wafer is reduced to substantially less than 15 per cent by weigh. Heat and pressure are maintained on the charge until the leaf and stem fragments comprising the wafer assume a permanently flattened condition with little spring-back. It is believed that stem and leaf fragments remain permanently flattened, at lesat in part, because of bonding which occurs within the fragments. The flattened stem and leaf fragments form a structurally sound, rigid, geometric configuration because the stem and leaf fragments are interlaced and interlocked.

It is not precisely understood how the stem and leaf fragments are bound together by the application of heat and pressure according to the present invention. It is believed that the high temperature releases and activates natural adhesives present in the hay. That is, sugars, lignins, starches, and other natural adhesives apparently are activated at the elevated temperatures here employed. On cooling, the adhesive matter binds the fragments together to form a dimensionally stable product which is still palatable and digestible by animals. The bonded pellets need not be as dense as previously known briquettes which have been found to be difficulty digested by ruminants.

The term "bonding" is used herein to designate the adhesion between the stem and leaf fragments which occurs without the addition of further binder at elevated temperatures and pressures. In addition to the release of natural adhesives in the hay, it is believed that the long cellulose chains in the hay may be adhered by hydrogen bonding at functional groups occuring along the chain lengths. It is known that such hydrogen bonding occurs with chains of polyamides, for example, and similar bonding may occur with the hay fragments. Moreover, the molecules may be held together in part by van der Waal's forces or even through ordinary valence bonds.

After the wafers have been formed as hereinbefore described, they are ejected as shown in step 16 and allowed to cool as shown in step 17. The wafers or pellets can be readily handled by conventional material handling equipment. The hay wafers thus formed are self-supporting masses which are shaped in such a manner that they have good flow characteristics.

A machine or apparatus suitable for forming hay wafers from hay in accordance with the process set forth in FIGURE 1 is shown in FIGURES 2–10. It consists of a self-propelled vehicle 19 which has a framework 21 upon which is mounted front and rear ground engaging wheels 22 and 23, respectively. Motive means is in the form of a motor 24 is provided for driving the wheels 22 and 23. Either or both sets of front and rear wheels 22 and 23 may be driven. However, in the present embodiment, I have found it satisfactory to only drive the front wheels. A screened air intake 25 is provided for the motor. Suitable means is provided for steering the self-propelled vehicle and includes a steering wheel 26 which is connected to means (not shown) for steering the rear wheels 23. A driving station 27 is provided on the front of the vehicle adjacent the steering wheel as shown particularly in FIGURE 3 and includes a seat 28 on which the operator of the vehicle may be seated while operating the machine.

The self-propelled vehicle 19 carries a hay pick-up unit 31, a hay chopper 32, a hay waferizing or pelletizing apparatus or assembly 33, a hay wafer elevator 34 and a storage bin 36.

The apparatus shown in FIGURES 2–11 is intended for field operation and is particularly adapted for use in picking up hay out of windrows. As is well known to those skilled in conventional farming operations, the grass, alfalfa, clover or other plants which are to be utilized for the hay are cut at a predetermined time in their growing cycle to maximize the nutrient values in the hay. After the hay has been cut, it may be allowed to dry in the sun before it is windrowed or, if desired, the hay can be windrowed at the time it is cut. If the hay is windrowed at the time it is cut, the hay is normally turned over to facilitate uniform drying of the hay.

In my apparatus, the hay is picked up out of the windrow as the apparatus is advanced through the field by a traveling endless belt 41 which carries a plurality of spaced pick-up elements 42. The hay is then deposited upon an upwardly inclined hay chute 43 and pushed rearwardly as additional hay is placed on the chute 43 until the hay comes into engagement with an auger assembly 44. The auger assembly is provided with flights 46 and 47 on opposite ends which have opposite pitches so that the hay will be urged inwardly towards circumferentially spaced toothed blade-like members 48 on the auger assembly which carry the hay rearwardly into rapidly rotating choppers 51 which chop the hay into the desired sizes as, for example, the choppers can be designed so that they will chop the hay into leaf and stem fragments so that the bulk of the stem fragments have a length which is greater than one inch but which is less than four inches. These hay fragments are removed from the choppers 51 by a blower 53 which blows the hay fragments up through a curved pipe 56 into a cyclone separator 57. The exhaust air from the cyclone 57 is exhausted through the screen 59. The pick-up unit 31 and the chopper 32 which has been described is substantially conventional and for that reason will not be described in detail. It is also for this reason that the drive means connected to the motor 24 for driving the belt 41, the auger assembly 44, the chopper 51 and the blower 53 have not been shown.

As the chopped hay fragments are separated from the air within the cyclone 57, they drop downwardly into a receptable 61 which is mounted within a framework 62 that forms a part of the waferizing or pelletizing apparatus or assembly 33. As shown particularly in FIGURE 2, the rectangular framework 62 which is provided for the waferizing or pelletizing apparatus is mounted upon the main frame 21 of the self-propelled vehicle so that the apparatus lies in a substantially horizontal plane.

Figure 9:
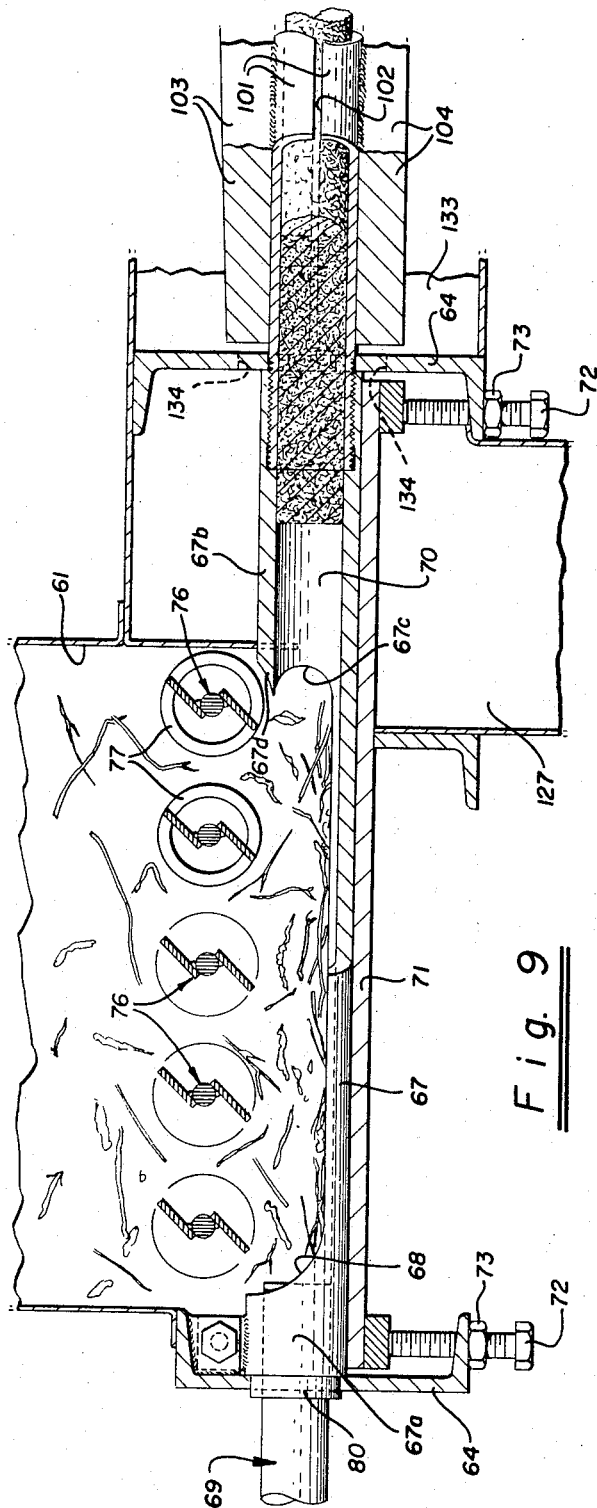
FIGURE 9 is an enlarged detail view, with certain parts in cross-section, of one of the plunger and die assemblies.

As can be seen from FIGURES 4–10, the waferizing or pelletizing apparatus 33 is of an extrusion type and consists of the framework 62. A plurality of vertical channel members 64 which lie substantially in a horizontal plane and which are spaced longitudinally of the framework 62 are affixed within the framework 62. A suitable number of extrusion assemblies 66 are mounted within the framework 62. Thus, as shown, eight extrusion assemblies 66 have been provided in the framework and are arranged in the framework 62 so that they extend longitudinally of the framework and are mounted side by side so that they extend across the framework as shown particularly in FIGURE 4. Each of the extrusion assemblies consists of a combination female die and guide member 67. As shown in FIGURE 9, this member 67 is substantially cylindrical as shown and is provided with a large cut-out to form charges receiving recess 68 which underlies the receptacle 61. The upper portion and the side walls of an intermediate portion of the member 67 have almost been completely cut away to provide the recess 68 so that an adequate charge of hay fragments may be received as hereinafter described. Each of the extrusion assemblies includes a piston or plunger 69 which is slidably mounted in a cylindrical portion 67a of the member 67 on one end of the recess 68. The plunger 69 forms a male die and is adapted to be reciprocated within the member 67 to advance charges of hay fragments from the recess 68 into a cylindrical die chamber 70 formed in the cylindrical portion 67b provided on the other side of the cut-out 68 as shown particularly in FIGURES 9 and 10. It will be noted that the chamber 70 has been formed so that there is no taper which ensures that the fragments or particles extending over the sides of the plunger will be sheared off by coaction between the outer edges of the plunger 69 and the edges of the upper and side walls of the female die formed by the portion 67b. In order to reduce the shock effect, the cut-out forming the recess 68 has been formed so that the side walls of the die are recessed rearwardly of the plunger in an arcuate fashion as shown at 67c so that shearing action will first take place between the top of the plunger and the top forwardly extending portion 67d of the female die. Thereafter, the shearing action will progress between the plunger 69 and the side wall portions 67c. As hereinafter described, shearing of the hay in this manner prevents the plunger 69 from riding upwardly within the member 67. Also, it ensures that there will be substantially no lateral compression of the charge of hay fragments within the die chamber 70 for a purpose hereinafter described.

As can be seen from FIGURE 9, a plate 71 is provided for supporting the members 67. The plate 71 is supported in a proper position between the channels 64 by use of cap screws 72 which are threaded into the channels 64 and which are locked in position by nuts 73.

As can be seen from FIGURE 9, the piston 69 is adapted to be moved to a retracted position so that a full charge of hay fragments can be introduced into the recess 68 by laterally extending impellers 76 spaced longitudinally of the members 67 and rotatably mounted in the compartment 61. The front two impellers 76 are provided with longitudinally spaced rings 77 which have a width substantially equal to the diameter of the members 67 and generally overlie the portions of the recesses 68 immediately in front of the cylindrical portions 67b. The hay fragments, as they fall in the cyclone 57, are received by the impellers 76 which feed the hay fragments into the charge receiving recesses 68. The impellers 76 can be driven in any suitable manner from the motor 24 by means (not shown).

The pistons or plungers 69 are slidably mounted in collars 80 provided in associated channel member 64. The plungers 69 are provided with rod-like extensions 81 which are mounted in bores 82 in laterally extending connecting member 83. The rod-like extensions 81 are secured to the member 83 by suitable means such as shear pins 84 which extend vertically through the ends of the rod-like extensions 81 and through the member 83. Means is provided for supporting the member 83 and the ends of the piston rods 81 connected thereto for reciprocatory movement and consists of a pair of spaced sleeve members 86 which are slidably mounted upon a pair of stationary guide bars 87 mounted in the framework 62 by upstanding portions 88.

A bar 91 is mounted upon the sleeve members 86 and is spaced rearwardly from the member 83 by a suitable distance such as four inches. A pair of spaced braces 92 also serve to connect the two members 83 and 91 so that they will move in unison with the sleeves 86. A connecting rod 93 is connected to the bar 91 by a split sleeve 94 fixed to the end of the connecting rod 93 and pivotally mounted on the bar 91. The other end of the connecting rod 93 is fixed to a split sleeve 95. The split sleeve 95 is pivotally mounted on a rod 98 which has its ends fixed to a pair of crank members 96 which are rotatably mounted in the frame 62. The crank members 96 include integral counterbalancing portions 97. The crank members 96 are driven from the motor 24 by a suitable drive such as a V-belt drive 99.

The bar 91 and the sleeve 94 have been spaced from the member 83 and from the ends of the plunger extensions 81 so that in the event one of the plungers or pistons 69 strikes a solid object during its forward stroke, the shear pin 84 associated therewith will be sheared to permit that plunger to remain stationary while the other plungers are advanced. Preferably, the spacing between the bar 91 and the member 83 should be greater than the distance which the plungers travel into the female die portions 67b so that if an object is struck which is greater than the diameter of the die, the entire mechanism will not be damaged.

Each of the extrusion assemblies 66 includes a female die extension 101 which, as shown in the drawings, is substantially cylindrical and which is threaded into the female die portion 67b as shown particularly in FIGURE 9. The extension 101 is of a predetermined length which is determined primarily by the hold time which is desired for the charge as hereinafter described. Means is provided for supporting the die extensions 101 and also for providing means whereby the diameters or sizes of the dies extension can be adjusted. To permit this adjustment, each of extensions 101 has been provided with diametrically opposed slots 102 extending substantially the entire length of the extension and which, as shown in FIGURE 9, lie in a horizontal plane to divide substantially all of the extensions 101 into upper and lower portions 101a and 101b. As shown in the drawings, the extensions 101 extend longitudinally of the frame 62 and are maintained in a predetermined spaced relationship within the framework by upper and lower vertical members 103 and 104 which are secured to the upper and lower portions 101a and 101b of the tubular extensions 101 by suitable means such as welding. The members 104 are retained by transverse vertical members 106 (see FIGURE 8) which are mounted within the framework 62. The members 104 are secured to lugs 107 provided on the transverse member 106 by suitable means such as bolts 108. The means provided for adjusting the position of the upper portion of the extension 101 with respect to the lower portion of the extension 101 consists of a plurality of hydraulic actuators 111 which have their plungers 112 pivotally connected to the plates 103 as shown particularly in FIGURES 5 and 8. As can be seen, the plate 103 for each of the extensions 101 is of varying cross-section so that a substantially uniform force is applied to all portions of the upper portion 101a of the extensions 101. The hydraulic actuators are mounted in transverse members 116 which are affixed on the frame 62. In order to ensure that adequate control will be had of all portions of the tubular extensions 101, a plurality of the hydraulic actuators 111 have been provided as can be seen from FIGURE 5. Thus, as shown, three hydraulic actuators 111 have been provided for each of the extensions 101. Means consisting of a hydraulic pump, a reservoir (not shown) driven by the motor 24 is provided and control means 118 connected to the pump is provided at the operator's station 27. This control means includes individual controls 119 for each of the actuators 111 in each row of actuators extending across the framework 62 are interconnected so that similar portions of the tubular extensions 101 will be controlled in the same manner to adjust the size of the tubular extensions 101.

Means is provided for maintaining the desired lateral spacing between the tubular extensions 101 and consists of spacer members 121 which are mounted in slots 122 provided in the upper and lower transverse members 106.

Means is provided for supplying heat to the portions 67b of the die members 67 and to the die extensions 101 and consists of burner means 126 disposed within a compartment 127 provided in the framework 72 (see FIGURE 5). The burner 127 is supplied with fuel from a suitable source such as a storage tank 128 which is also mounted within the framework 62 and connected to the burner 126 by piping 129. Suitable control means is provided of a conventional type which is accessible in the control station 118 provided on the operator's platform 27 for controlling the rate of fuel combustion within the chamber 127. Any suitable fuel may be utilized in the burner. However, I have found it desirable to utilize butane in view of the fact that it is possible to obtain substantially 100 percent combustion. Since this is the case, no noxious fumes will be passed into the hay which is being waferized. Suitable means is also provided for supplying heat to each of the plungers 69 and consists of an electric heating element 125 mounted in the front end of each of the plungers.

A rectangular housing 130 is provided for enclosing the die portions 67b of the member 67 and the die extensions 101 and consists of upper and lower walls 131 and 132 and side walls 133 which are mounted within the framework 62 as shown particularly in FIGURE 7. A plurality of openings 134 are provided in the channel member 64 adjacent the tubular extensions 101 so that heat can readily pass longitudinally of the chamber or housing 130 which encloses the tubular extensions 101. In order to increase the flow of heated air over the die portions 67b and the extensions 101, a fan 136 has been provided adjacent to the burner compartment 127. This fan 136 continuously drives the hot air upwardly over the portions 67b through the openings 134 and then longitudinally along the die extensions 101 and expelled to the atmosphere at the ends of the extension. The hot air heats the dies to the desired temperature to aid in waferizing the hay and dissipating the moisture from the hay as hereinafter described.

Means is provided for collecting the waferized product as it is extruded or ejected from the extensions 101 and consists of a trough 141 which is provided at the rear of the framework 62 and which leads downwardly into the bottom end of an endless belt conveyor 142. The conveyor 142 delivers the product, raises or elevates the product wafers upwardly and deposits them into the storage bin 36. As can be seen particularly from FIGURE 3, the storage bin 36 is mounted on one side of the self-propelled vehicle and is provided with an upwardly inclined bottom wall 151 upon which is mounted an endless conveyor 152 that is driven by a chain 153 from the shaft 146. An unloading chute 154 has been provided on the bin 36. This unloading chute is positioned in such a manner that a wagon or truck can be positioned under the unloading chute 154 and the conveyor 152 operated to unload all the wafer or product within the bin into the truck or wagon. Access to the bin is provided through a door 156 which has been provided with a window 157 to permit viewing of the contents within the bin 36.

Use of the apparatus shown in FIGURES 2–10 in performing my method or process for the manufacture of hay wafers or pellets may now be briefly described as follows. Let it be assumed that the hay which is to be utilized for the making of hay wafers has been properly prepared as hereinbefore described by first cutting the grass, alfalfa or clover and the like and permitting the same to be sun dried within the field by either allowing it to dry in windrows to a moisture content ranging from 10 percent to 18 percent by weight can be readily obtained within approximately three or four days after cutting of the hay.

Now assuming that the hay in the windrows is ready to be wafered or pelleted, the operator starts the machine, and causes the machine to advance down the windrows so that the hay is picked up by the pick-up unit 31 and pushed upwardly and rearwardly into the chute 43 so that it is advanced by the auger assembly 44 into the rapidly rotating choppers 51 which reduce the hay to stem and leaf fragments in which the bulk of the stem fragments have a length which is greater than one inch or the longest dimension of the wafer, but which is less than four inches. It is desirable to keep the hay as long as possible without encountering any undue difficulties in feeding hay in the waferizing apparatus 33. The longer the hay fragments, the better mechanical interlocking, the greater the holding effect and the better the intermingling of the stem fragments to provide a more durable pellet and also to provide the desired coarse material which is required by ruminant animals when it is broken up. These fragments of dried hay are removed by the blower 53 and carried upwardly through a pipe 56 into a cyclone separator 57.

The stem and leaf fragments drop downwardly in the sepaartor 57 into the compartment 61 by force of gravity where they are carried downwardly into the charge receiving openings 68 provided in the extrusion assemblies 66 as shown particularly in FIGURE 9. The impellers 76 feed the fragments into the charge receiving openings 68. The charge receiving openings 68 have a dimension so that sufficient stem and leaf fragments can be received within the same to provide a charge which will form one complete wafer on each stroke of the plunger, as hereinafter described.

Figure 10:
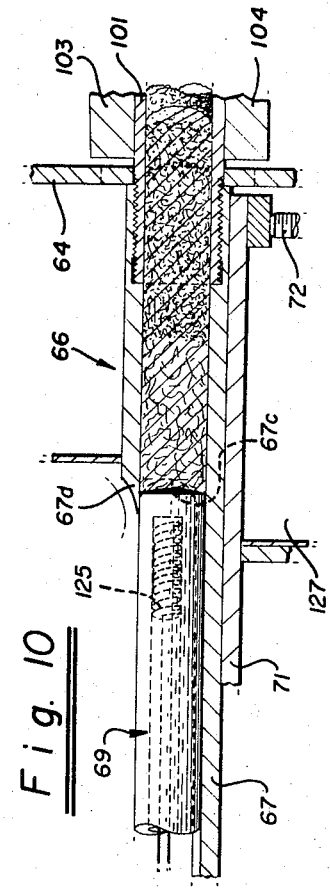
FIGURE 10 is a detail view on a reduced scale of charge being introduced into the die by the piston.

During the time the chopper 32 is operating, the plungers 69 are continuously reciprocated in unison and are moved from a retracted position, as shown in FIGURES 6-9, to a compacting position which is to the right of the position which is shown in FIGURE 10. When the plungers 69 are advanced, they serve to urge the material (hay fragments) within the recess 68 forwardly or to the right as viewed in FIGURE 9. At the time that the plungers 69 are being advanced, the impellers 76 and particularly the rings 77 carried thereby prevent the hay which is within the recess 68 from moving upwardly out of the recess 68 and also urge it downwardly to compact it. Continued forward movement of the plungers 69 causes the hay to be urged into the cylindrical die chambers 70 to compact the same and to cause the hay to assume the configuration of the die. As the plungers 69 near the forward extremities of the die portions 67b, any hay fragments protruding beyond the side edges of the forward extremity of the plunger are sheared or cut off by the cooperation of the plungers 69 and the knife-like portions 67c and 67d provided on the fornt extremities of the female dies. In order to reduce the shock effect on the plungers causes by the shearing action, the portions 67c have been arcuately recessed so that the shearing action will first take place at the top and then at the side portions of the plunger. Shearing of the hay fragments in this manner, that is, by first cutting the hay fragments protruding over the top of the plunger assures that the plungers 69 will not ride upwardly. It will be noted that the forward impeller 76 which immediately overlies the forward extremity of the female dies 67b rotates in a direction so as to minimize the quantity of hay fragments which must be sheared off by the plunger 69 when it enters the female die portion 67b Because of this shearing action of the plungers 69 cooperating with the female die portion 67b, and also because there is no taper provided in the die chambers 70, there is no lateral compression of the hay fragments within the die.

Longitudinal compression of each charge is affected by ramming the charge against the previously formed charges which are already located in the die chambers. Normally, the hydraulic actuators 111 are operated so that the upper portion 101a of the die extensions 101 are biased downwardly to form somewhat elliptical shapes which have a cross-sectional area which is slightly less than the cross-sectional area of the cylindrical chambers 70. Thus, as the succeeding charges are moved into the die extensions 101, the charges are placed under radial compression to increase the friction between the charges of hay and the confining die walls. By controlling the hydraulic actuators 111, the desired amount of friction can be obtained to build up the desired amount of "back pressure" against which the plunger 69 can compress the charge of hay to the desired degree of compaction. After the die extensions 101 have been filled, the pressure which is applied in forming the charges remains substantially constant because each time that a charge is introduced, a hay wafer is normally ejected from the other end of the die.

The extrusion resistance is only being utilized to obtain the desired wafer density. The extrusion resistance is not being utilized to generate any substantial amount of the heat which is required in my process. Conventional extruding apparatus often generates substantial amounts of heat by virtue of the slope in the die which creates increased friction as the extruded material passes through the die. Such friction expends an enormous amount of energy without the creation of any great amount of heat for bonding purposes. Heat is produced in the present invention by applying it directly without the energy-wasting friction of prior art extruding devices. Accordingly, the power requirements of the present apparatus are substantially reduced.

During the time that the female die portions 67b are being charged by the plungers 69 and the hay being formed to the configuration of the die by compaction of the hay within the die, the die portions 67b are being heated by the heated gases which are passing upwardly from the chamber 127 so that the die has a temperature which is normally greater than the normal temperature of boiling water, (212° F.), for a purpose hereinafter described. For example, the die temperature is usually at least 225° F. Thus, at the same time that I am compacting the hay to a desired configuration, I am applying heat to the hay which is in addition to any heat which may be created by the compression of the hay by friction between the hay fragments and any friction between the hay and the female dies. At the same time, I am supplying heat to the hay which is in contact with the plunger 69 which is continuously heated by the heating element 125 so that it also has a temperature normally greater than the temperature of boiling water.

Since the walls of the die 67b are being continuously heated, they continuously supply heat to the hay which is within the die. I have found that it is very desirable to maintain heating of the hay for a predetermined hold time by providing the slotted die extensions 101 which are also heated by the heated gases from the compartment 127. The heated gases travel rearwardly along the extensions 101 within the elongated chamber 130. By supplying heat to the hay while it is maintained in a compressed condition within the die, it is possible to drive moisture out of the hay and to vaporize the same, and more particularly to at least drive moisture out of the outer margins of the wafer. Although I do not completely understand what occurs to the hay within the die chambers, it is believed that this moisture which is driven off serves as a lubricant and causes the long cellulose molecules forming the majority of the hay to slide better with respect to each other to facilitate the flattening of the hay fragments. A permanent flattening of the stem and leaf fragments of the hay then occurs because of the bonding. For this reason, it is believed that substantially no expansion occurs when the wafers are ejected from the die extensions.

By using a temperature well above the normal boiling point of water, the natural adhesives present in the hay are released. With the wafer or pellet being maintained under pressure for a sufficient time at elevated temperatures, the adhesive forces are permitted to bind the fragments together. It therefore appears that pressure and high temperatures are necessary for the production of permanently flattened wafers.

Any excess moisture which is driven off from the hay and which is in the form of vapor can escape from the hay forwardly out of the die chamber through the recesses 68 when the plungers 69 are retracted. This is particularly true because there is some springback of the material which aids in the escape of moisture. Thereafter, it is believed that additional vapors may escape from the slots 102 as the pellets or wafers are advanced in the die extensions 101.

By this application of heat to the hay after it has been compressed within the die, I found that the stem and leaf fragments remain relatively intact but assume a permanently flattened condition and that the stem fragments are mechanically interlaced and interwoven so that each charge which is introduced into the die forms a cylindrical wafer which has a length which is approximately equal to the diameter of the wafer and in which at least the peripheral or outer regions of the wafer are bonded together to provide a self-supporting relatively stable mass. This includes the front and rear flat surfaces of the wafer which are also bonded in a similar manner because of the application of heat from the plunger 69 and also from the application of heat from the front surface of the preceding wafer which has been introduced into the die chamber.

The charges which are introduced into the die chambers are of sufficient size so that each charge will form a wafer which has a length which is substantially equal to the diameter of the wafer. Because of the heating of the front and rear surfaces of the wafers and because of the smooth surface of the front ends of the plungers 69, I have found that when the wafers are ejected from the die extensions 101, there is a relatively natural cleavage plane perpendicular to the axis of the wafers formed between the wafers so that as the wafers are ejected from the dies, they normally will be broken off from the succeeding wafers by the force of gravity.

Because of the relatively long hold times which may be required, I have found it desirable to utilize a plurality of relatively short extrusion assemblies 66 rather than a few relatively long extrusion assemblies because of the obvious advantages of short assemblies in apparatus for field use. For stationary use, the long extrusion assemblies may be found to be more desirable. Because of the relatively large number of extrusion assemblies, the wafer production is quite high even though long hold times are used. However, both assemblies hold relatively large quantities of hay when the apparatus is being operated because of the hold times required.

In the preparation of the hay wafers with my apparatus in accordance with my method of process, it can be seen that there are three primary parameters which can be varied. They are pressure, temperature and hold time. I have found that satisfactory hay wafers can be produced within the following ranges for these parameters:

Die temperature _____ ° F__    225–400
Pressure _____p./sq. in__  200–10,000
Hold time _____seconds__  1–120

The hold time can be changed either by shortening or lengthening the dies or by increasing the speed of reciprocation of the plungers 69, or by increasing the charge in the charge receiving recesses 68. It can be stated generally that the longer the hold time, the more stable the wafers which are produced by the apparatus.

The hay wafers produced within these parameters can have a wafer density ranging from 25 to 80 pounds per cubic foot. It is generally preferred to have a density of at least 30 pounds per cubic foot to prevent fraying and achieve the advantages of the invention. On the other hand, densities in excess of about 45 pounds per cubic foot tend to be too dense for easy digestion by ruminants. Substantially greater densities than about 45 pounds per cubic foot approach the briquette type of feed which has been found to be unsatisfactory. Accordingly, a range of about 30 to about 45 pounds per cubic foot is the preferred density.

While satisfactory pellets or wafers may be obtained with a die temperature of 225 to 400° F., it generally is necessary to have a die temperature of at least 250° F. in order to release the adhesive forces within the hay. On the other hand, a temperature of 400° F. or greater tends to discolor certain kinds of hay if the hold time is greater than a few seconds. Preferably, the temperature of the die should not exceed 350° F. in order to avoid scorching of the hay and the high operating costs necessary for higher temperatures. In the range of 250 to 350° F. optimum performance results.

While high pressures may be necessary where the hold time is extremely short and the temperature is at the lower end of the range, generally speaking the pressure need not be above about 2,000 pounds per square inch. If temperature and hold time are within the preferred range, satisfactory wafers may be obtained with pressures between 200 and 2,000 pounds per square inch. Thus, the high cost of providing pressures of 5,000 pounds per square inch or higher may be avoided by careful selection of temperature and hold time.

As to hold time, much greater pressures are required where the time is one second. Moreover, where the hold time is 120 seconds, the pellet tends to be extremely dense if high pressures are employed. The preferred range for hold times is between about 1 and 30 seconds. Within this preferred range, satisfactory wafers are obtained under most operating conditions.

I have found that hold time has the greatest effect on density when a temperature ranging from 300° F. to 350° F. is used. Thus, by experimentation, I have found that approximately 350° F. is an optimum temperature. Lower temperatures can be utilized. However, with such lower temperatures, the hold time or pressure must be increased substantially to obtain the same results. Also, substantially higher temperatures can be used. However, when such temperatures are used, there is a danger of charring or burning the hay. It is for this reason the acceptable results can only be obtained from a temperature ranging from 225° F. to 400° F. However, higher temperatures can be utilized on the plunger itself because the plunger is only in intimate contact with the hay at the time the plunger is at the forwardmost part of its stroke and at which time the pressure on the hay is greatest. The plunger will be rapidly retracted.

Figure 12:
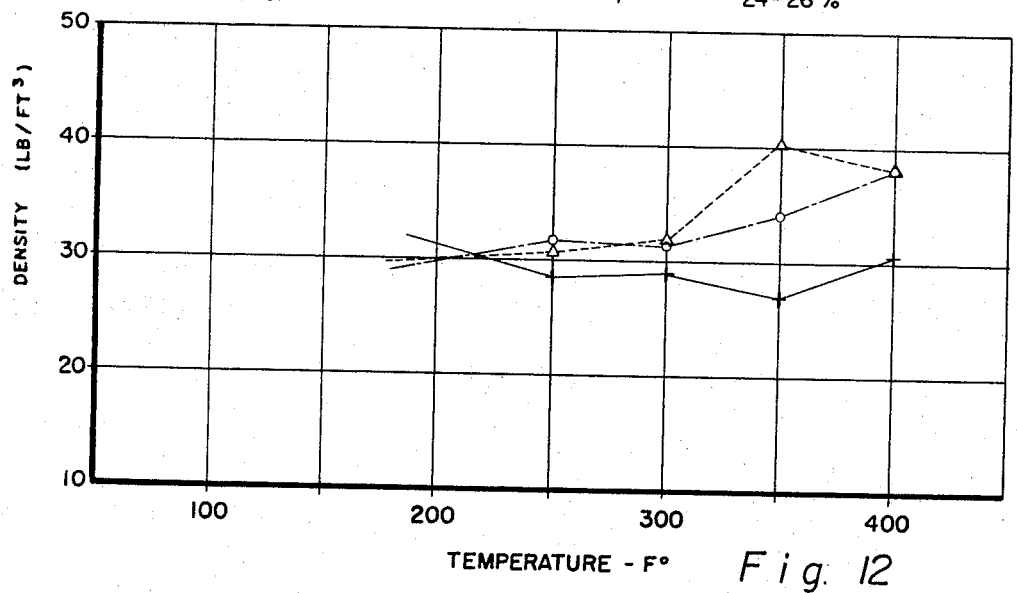
FIGURE 12 is a graph showing wafer density plotted against temperature.
Figure 13:
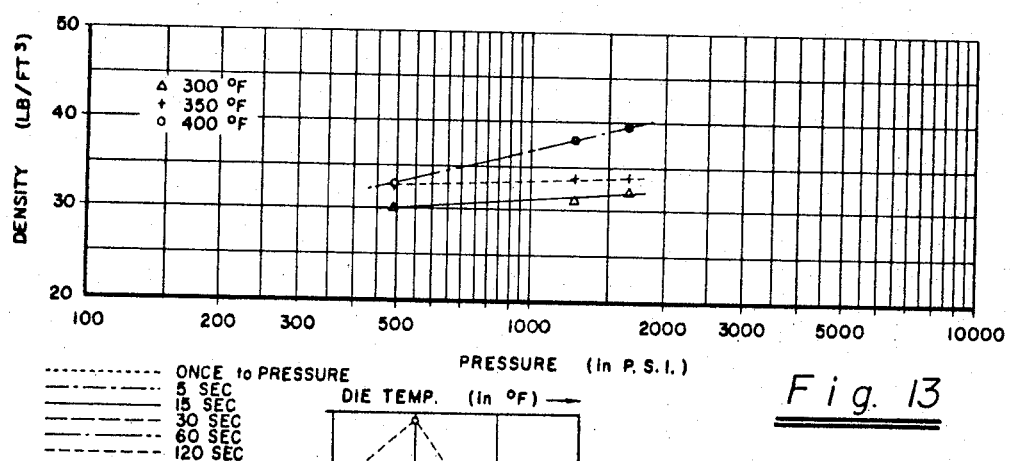
FIGURE 13 is a graph showing pressure plotted against wafer density.
Figure 14:
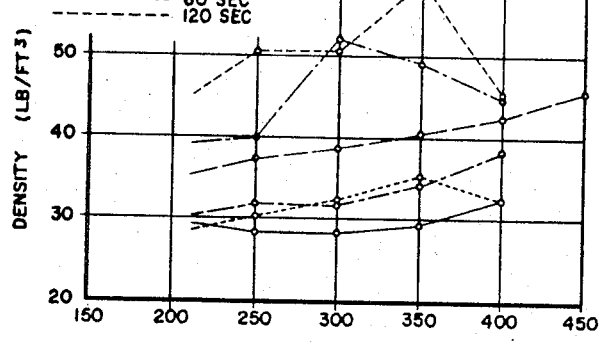
FIGURE 14 is a graph showing temperature plotted against wafer density.
Figure 24:
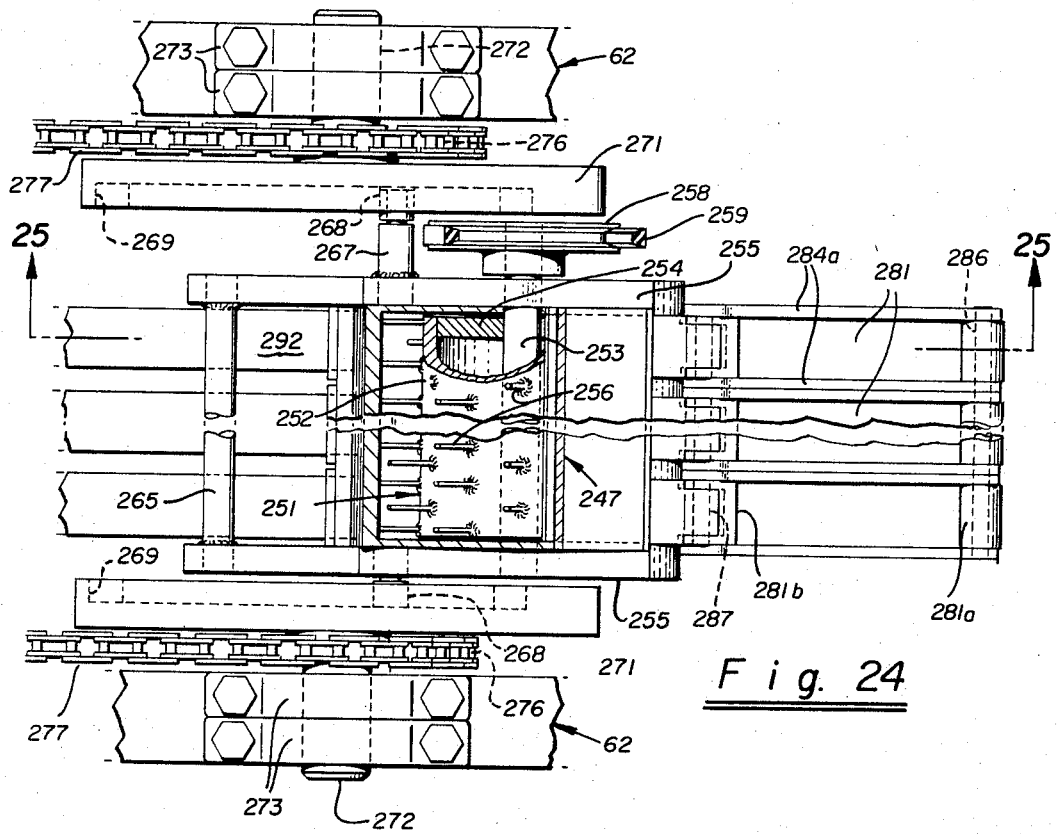
FIGURE 24 is a partial cross-sectional plan view taken along the line 24—24 of FIGURE 25 showing a particularly novel feeding asesmbly for use in my apparatus.
Figure 27:
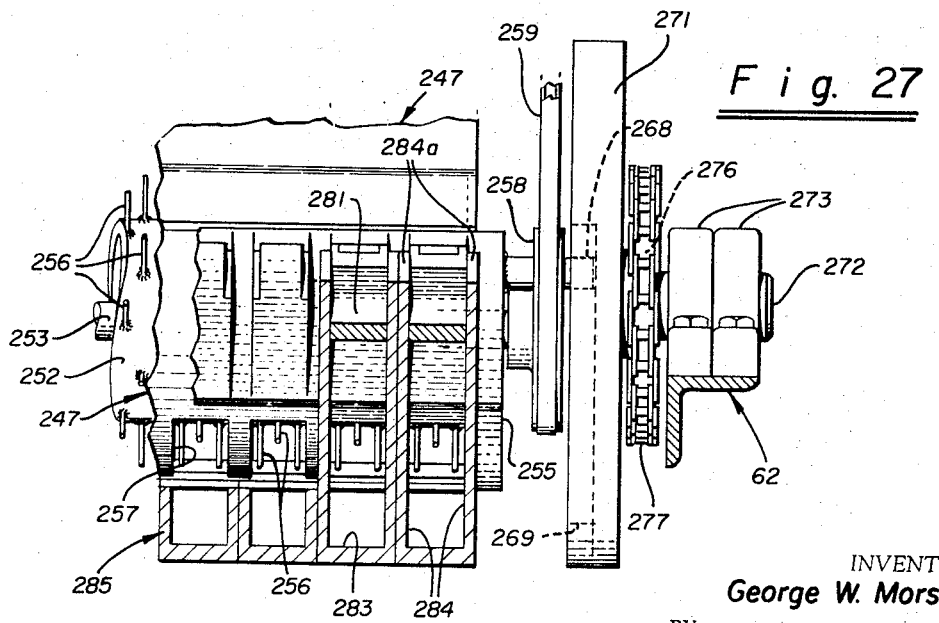
FIGURE 27 is a cross-sectional view taken along the line 27—27 of FIGURE 25.
Figure 25:
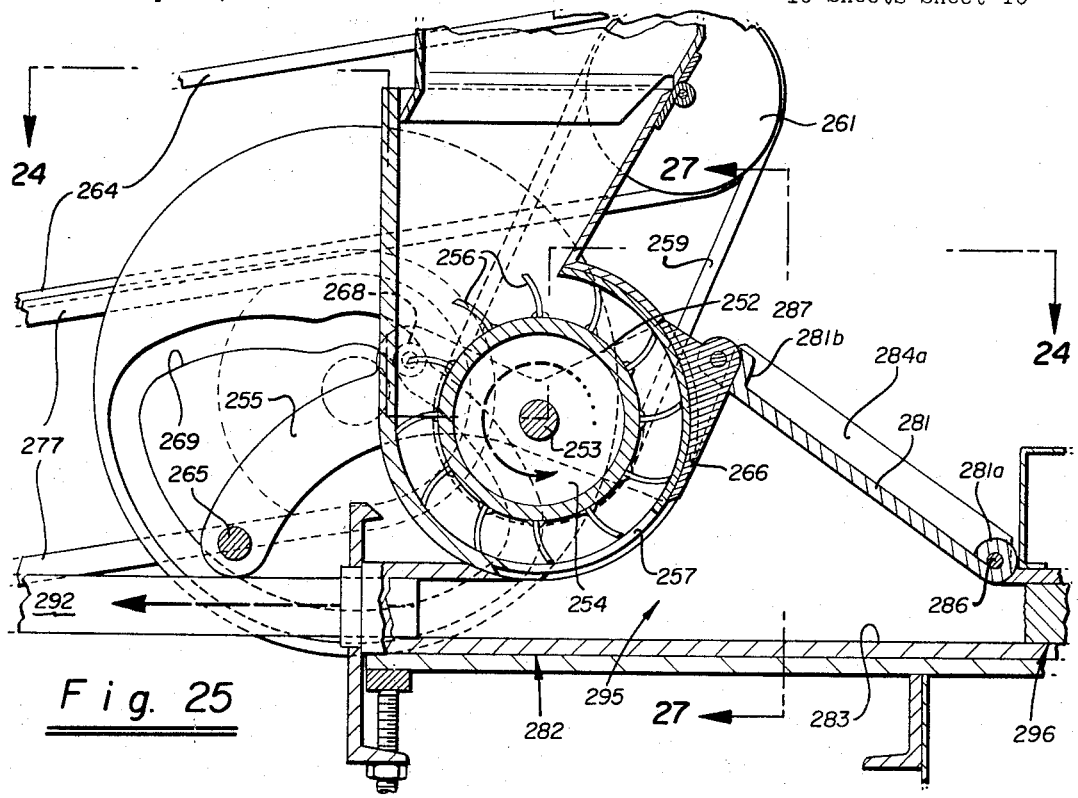
FIGURE 25 is a cross-sectional view taken along the line 25—25 of FIGURE 24.

The effect of the various parameters in the process on the density of the wafer is shown in the graphs in FIGURES 12, 13 and 14. In FIGURE 12, a plot of density against temperature is shown utilizing a pressure constant at 1220 p.s.i., alfalfa chopped to approximately one inch, pellet weight about 15 grams, and hold time of 15 seconds. The moisture content is varied between 6–7%, 11–12%, and 24–26%.

It will be noted from FIGURE 12 that high moisture content tends to form less dense pellets. Only when the temperature is raised to 400° is a pellet density of 30 pounds per cubic foot attained using hay having a moisture content of 24–26%. At that temperature, substantial amounts of the moisture are removed in the process.

In FIGURE 13, there is shown a graph of pressure vs. density in which one inch chopped alfalfa having a moisture content of 11–12 percent was utilized and with hold times of 15 seconds to produce pellets or wafers having nominal weight of 15 grams. This graph shows that the variation in pressure will have the least effect on density when the die temperature is between 300° F. and 350° F. This can be seen from the fact that the curves representing the 300° and 350° temperatures have a much smaller slope than the other curves. This graph clearly establishes that with an optimum temperature such as 350° F., the application of great amounts of pressure is not required to obtain pellets or wafers having desired densities. This graph also shows that pressure cannot be substituted for heat to accomplish the same results. In runs not shown on the graph in FIGURE 13 with similar material utilizing a hold time of 60 seconds and 10,000 p.s.i., densities of approximately 65 and 80 pounds per cubic foot were obtained at temperatures of 260° F. and 300° F., respectively.

In FIGURE 14, there is shown a graph of die temperature vs. density with pressure constant at 1220 p.s.i., utilizing various hold times, also using one inch chopped alfalfa having a moisture content of 11–12 percent. From this graph, it can be seen that hay wafers having relatively good density were obtained with relatively short hold times. This has been found to be possible because even though the hay may not be heated all the way through, the peripheral regions of the wafers have been heated after compaction so that the bonding hereinbefore explained occurs in these peripheral regions to set the material which is on the exterior of the pellet or wafer. Therefore, a wafer is provided which is relatively durable even though the internal portions of the same may not be bonded in the same manner as the peripheral regions. However, from this graph shown in FIGURE 14, it can be seen again for at least a number of the different hold times shown a temperature of 300° F.–350° F. is an optimum temperature for obtaining the highest density with the shortest hold time.

By way of example, an optimum product was obtained by utilizing alfalfa which has been dried in the sun until it contained 11–12 percent moisture and which was then chopped into leaf and stem fragments, the bulk of which has a length greater than one inch. The die was heated to a temperature of 350° F., and the charge was compressed under a pressure of 1220 p.s.i. The charge was held at this temperature and pressure for a period of thirty seconds. Upon ejection, it was found that the hay wafers expanded very little and had a density of 41.5 pounds per cubic foot. The exterior pellet, upon cooling, was structurally a sound wafer. However, the wafers, even though structurally sound, could be easily chewed and broken up by ruminant animals, particularly when positioned so that the crushing force was applied at right angles to longitudinal axes of the wafers.

In the machine after the wafers are ejected from the dies, they fall downwardly by gravity and are carried by the chute 141 to the elevator 142 which elevates the pellets into the bin 36. When a load of pellets has been received within the bin 36, the conveyor 152 can be operated to discharge the load of wafers into a truck or other suitable hauling device.

I have found it desirable to provide the wafer with a cylindrical configuration and a configuration in which the length equals or exceeds the diameter. Thus, I have found that pellets having a diameter of 1½ inches and a length of 1½ to 2 inches were very satisfactory. Pellets formed in this manner were found to give a relatively high bulk density as, for example, 35 pounds per cubic foot. Also, because of this size and shape, it was found that the wafers could be readily handled by conventional material handling equipment such as elevators utilized in my machine. Also, it has been found that because of the cylindrical configuration, the wafers have excellent free-flowing characteristics so that the force of gravity can be readily used in handling the wafers. The hay wafers manufactured by my apparatus in accordance with my method and process were found to have a moisture content ranging from 5 percent to 20 percent by weight, the moisture content being somewhat dependent upon the moisture content and the hay being waferized or pelletized. However, I have found that from 2 to 4 percent moisture is removed by weight from the hay during waferizing or pelleting of the hay which enhances the keeping qualities of the wafers or pellets. The wafers will keep satisfactorily with a moisture content below 18 percent by weight. Thus, I have found it possible to produce wafers ranging in moisture content from 3 percent to 18 percent by weight, which can be stored in open storage without any danger of mold or spoilage if they are protected from the elements.

I have found that the wafers or pellets which are produced by my machine are very palatable to animals and particularly to ruminants. I have found that ruminants can readily assimilate the wafers and they can be readily broken up by them by chewing to provide a relatively coarse hay which is required for ruminants.

I have found that my machine makes possible a substantial reduction in the horse power required per ton of wafers. Although the machine I have shown has a limited capacity, it is readily apparent that the capacity can be increased by providing additional extruding or wafering assemblies or apparatuses 33 which are positioned side by side and which are connected to the crank shaft 96 so that the plungers 69 are operated out of phase with the other plungers. For example, if two separate wafering assemblies are utilized, the plungers for each of the assemblies can be operated so that they are 180° out of phase. If three are utilized, they can be operated so that each is 120° out of phase. The cyclone 57 can be arranged so that it will supply hay to all of the wafering assemblies, either individually or as a unit. The same elevator 142 could be utilized for elevating the wafers and they all could be stored in the bin 36. Thus, it can be seen that a machine having a relatively high capacity can be provided.

Although I have disclosed my method and apparatus as being performed by utilizing apparatus which uses extrusion, it is readily apparent that, if desired, the method and process can be utilized with closed-end cylinders. Plungers would be used for forming the material within the closed-end cylinders. The cylinders and plungers would be heated to provide the desired amount of heat to the hay which is retained in a compacted condition for predetermined periods of time to obtain the same effects.

In addition, the extrusion assemblies can take the form shown in FIGURES 15–19. In the extrusion assemblies shown in FIGURES 15 and 16, the extrusion assemblies have a cross-section which is rectangular rather than the circular configuration of the extrusion assemblies 66 hereinbefore described. The extrusion assemblies 161 extend longitudinally of the framework 62 as do the extrusion assemblies 66.

Each of the extrusion assemblies 161 consists of a combination female die and guide member 162. As can be seen particularly from FIGURE 16, the member 162 is substantially rectangular and is provided with a bottom horizontal wall, a pair of spaced parallel vertical side walls 164 and a top wall 166 which is spaced from and parallel to the bottom wall 163. The forward portion of the top wall 166 of the member 162 is cut away so that a relatively large charge receiving recess 167 is formed in each of the members 162. The forward extremity of the remaining portion of the top wall 166 is provided with a downwardly and inwardly curved tapered surface 168 for a purpose hereinafter described. The member 162 is provided with slots 169 extending subustantially the entire length of the same in the side walls 164 and spaced substantially equi-distant from the bottom and top walls 163 and 166.

Each of the extrusion assemblies 161 also includes a plunger 171 which forms a male die and reciprocates within the female die and guide 162. The plunger 171 also has a rectangular configuration to conform to the configuration of the die member 162. These plungers are driven in the same manner as the plungers 69 hereinbefore described. In order to minimize galling between the plunger and the die member 162, the plunger may be provided with a suitable covering 172 as, for example, a covering of Teflon which is securely bonded to the exterior surfaces of the plunger 171. For the purpose of heating the plunger 171, the plunger may be provided with a heating element 173 in the same manner as the plunger 69.

The operation of these extrusion assemblies is very similar to that of the extrusion assemblies hereinbefore described. The primary difference is that the hay fragments, as they drop into the charge receiving recesses 167, will be formed into rectangular elongate separated masses within the charge receiving recesses. The impellers 76 will again facilitate the charging of the recesses so that when the plungers 171 are retracted, a charge is quickly received within the recesses 167. Thereafter, the plunger is advanced to advance the charges into the die portions of the members 162. Again, the rings 77 serve to prevent the hay fragments from being pushed upwardly out of the charge receiving recesses 167 as the plungers are being advanced. Also the downwardly inclined tapered surface 168 provided on the top wall 166 of each of the members 162 ensures that the piston will not be pushed upwardly in the charge receiving recess as it is advanced. Alternatively, the top wall 166 can be provided with an upwardly inclined surface on its upper surface adjacent which the forward rings 177 can travel.

The hay fragments are compacted into wafers of the desired density and with the desired structural strength in much the same manner as hereinbefore described for the previous embodiment. However, in this case, the primary difference is that the wafers will have a rectangular configuration rather than the round configuration hereinbefore described.

In the extrusion assembly 181 shown in FIGURES 17–19, a female die and guide member 182 is utilized which has a rectangular configuration at one end and a circular or cylindrical configuration at the other end as hereinafter described. As shown in FIGURE 18, the forward extremity of the member 182 is rectangular and is provided with a bottom wall 183, spaced parallel side walls 184 and a top wall 186 which is spaced from and parallel to the bottom wall 183. The forward portion of the top wall 186 is cutaway in the same manner as shown in FIGURE 15 to provide a rectangular charge receiving recess 187 which also guides a plunger having a rectangular configuration such as the plunger 171 shown in FIGURE 15. The remaining portion of the top wall 186 is also provided with a tapered surface 188 in the same manner as the top wall 166 in the embodiment shown in FIGURE 15.

The wafer is formed in the same manner within the die member 182 as described in the foregoing embodiments. As shown in FIGURE 18, this wafer would have a substantially rectangular configuration. In order to obtain the advantages of a wafer having a circular configuration, the wafer is transformed from one of a rectangular configuration to one having a cylindrical configuration by a taper in the vicinity of 189 as shown in FIGURE 17A and as indicated in FIGURE 18 to change the die member 182 from one having a circular configuration. The die member 182 is formed in such a manner that the total cross-sectional area in the circular portion of the die member is substantially identical to the cross-sectional area of the rectangular portion of the die member. The die member 182 is also provided with slots 191 which are utilized for the same purpose as described in the previous embodiments. However, in order to facilitate the escape of moisture from the wafers during the time they are being heated and also to facilitate the use of higher temperatures, the die member 182 has been provided with a plurality of rectangular slots or openings 193. These slots or openings 193 are arranged in such a manner that small portions of the wafer will be exposed in these slots at certain times and so that no portion of the wafer will remain in contact with the die over a predetermined period of time without being exposed in one of the openings 193. These openings or slots 193 facilitate the escape of moisture from the wafer as it is being heated and also make it possible to utilize higher temperatures for heating the dies because the dies are not in continuous contact with the exterior surfaces of the wafer. Use of these higher temperatures makes it possible to increase the production from the machine and also makes it possible to reduce the hold time while increasing the structural strength of the wafers. Although I have described the slots 193 as being rectangular, it is readily apparent that, if desired, the slots or openings 193 can have any other desired configuration such as circular, diamond-shaped, etc.

Still another embodiment of my extrusion assembly is shown in FIGURE 20 in which the dies have been designed to minimize friction caused by lateral compression of the charge in the die. As shown in FIGURE 20 of the drawing the extrusion assembly consists of a female die and guide member 201 which is substantially rectangular in cross section as the female die and guide members 162 shown in FIGURE 15. However, it is readily apparent that if desired, a female guide and die member having a circular cross section can be utilized if desired. The female guide and die member 201 is formed to provide a relatively short compression chamber 202 which should not have a forward taper, i.e., one in which the cross-sectional area increases toward the front end of the chamber, but preferably it should be formed without any taper or with a gradual reverse taper, i.e., one in which the cross-sectional area increases toward the rear end of the chamber. An extension 203 is provided for the die member 201 and is connected thereto by a threaded internal connector 204 which is threaded into the die member 202 and into the extension 203. It will be noted that the internal cross-sectional area of the extension 203 is substantially greater than the corresponding area of the die member 202 for reasons hereinafter explained.

Means is provided at the discharge end of the extension 203 for applying resistance or in other words lateral compression to the charge which has been formed in the die and consists of a member 206 which has been cut from the extension 203 at the discharge end thereof. The member 206 is hinged for movement toward and away from the extension 203 by means of a pin 207 which pivotally interconnects a lug 208 provided on the member 206 and a lug 209 provided on the framework 62. As shown by the dashed lines in FIGURE 20, portions of the member 206 have been cut away to provide tapered recesses 211 and 212 to permit movement of the member 206 downwardly to decrease the effective internal cross-sectional area at the discharge end of the extension 203.

Means is provided for adjusting the position of the member 206 and consists of a hydraulic actuator 216 which can be controlled from the control box 118 in the driver station 27 to adjust the lateral compression forces applied to the charge at the discharge end and thereby the longitudinal compression forces as hereinafter described.

The hay is introduced into the die member 201 by a reciprocating plunger or piston 221 of the type hereinbefore described.

In utilizing this embodiment of my extrusion assembly, heat is supplied to the extrusion assembly in the same manner as hereinbefore described. However, in this embodiment, the die member 201 and the die extension 203 are not split as were the previous dies with the exception of the tapered recess 211 which is provided between the member 206 and the lower portion of the discharge end of the die extension 203. The hay is introduced into the chamber 202 by the plunger 221 in the same manner as hereinbefore described. The hay is formed into a charge in the relatively short compression chamber 202 having a cross-sectional configuration substantially identical to the cross section of the interior of the die member 201.

As soon as the charge has been formed in the compression chamber 202 I have found it desirable to minimize as much as possible any friction between the wafers and the side walls of the die and for this reason I have provided the die extension 203 with an internal cross-sectional area which is greater than that of the charge so that as soon as the charge is extruded out of the chamber 202, the lateral compressive forces are substantially removed or reduced so as to greatly reduce the amount of force required to move the charge in the die extension 203. In the embodiment shown, the die extension 203 has a substantially uniform cross-sectional area throughout its length. If desired the die extension 203 can be provided with a reverse taper, that is, with a gradually increasing cross sectional area in the direction of the discharge end rather than the uniform cross-sectional area shown in the drawings. Such a construction also greatly reduces the friction retarding movement of the charge through the die extension.

I have found that it is possible to retain the conformation supplied to the charge by the die member 201 as it travels through the die extension 203 by maintaining the charge under longitudinal compression. This is accomplished by utilizing the member 206 to vary the cross-sectional area at the discharge end at the die extension 203 to thereby vary the force required to extrude the charge from the die extension. In this manner the desired amount of pressure is provided during the time that bonds are being formed in the charge as hereinbefore described. Thus it can be seen that instead of relying upon friction to supply heat to the charge, I have minimized friction as much as possible and have supplied the heat from an external source ot the charge. It can be seen that I have greatly reduced the power required to extrude the charge through the die and die extension because of the reduced friction.

In examining the wafers made with such an extrusion assembly, I have found that the ends of the wafers are slightly convex. I believe that this is caused by the fact that the periphery of the wafer is strengthened and hardened to a greater degree by the heat which is applied to the dies and therefore there is slightly greater spring back of the inner portions of the wafers. The convex ends on the wafers enhance the flow characteristics of the wafers.

In order to still further reduce the frictional forces tending to restrict movement of the compressed hay fragments through the die 201 and the die extension 203, I have found it desirable to bathe the outer periphery surface of the charge as it passes through the die with water. An extrusion assembly for accomplishing the bathing of this peripheral surface is shown in FIGURES 21-23. It consists of a female guide and die member 226 which forms a relatively short compression chamber 227. A cup-shaped member 228 which is provided with a threaded extension 228a is threaded into one end of the die member 226 and has an internal diameter which is substantially identical to the diameter of the die member 226. A plate 229 is threaded into the cup member 228. An O-ring seal 231 is provided for establishing a water tight seal between the cup member 228 and the plate 229. The plate 229 is provided with an extension 229a which forms an extension of the die chamber 227.

The members 228 and 229 in cooperation with each other form an annular groove 233 which opens into the die chamber 227 and which extends completely around the die chamber. This groove 233 is connected by passages 234 to an annular recess 236. This annular recess is connected by a passage 237 to a pipe 238. The pipe 238 is connected to a suitable supply of fluid. For example, as shown it can be connected to a water reservoir 241 from which water is supplied under pressure by pump 242 through a pressure relief valve 243. Excess water is returned to the reservoir through a pipe 244.

Use of the extrusion apparatus shown in FIGURES 21-23 is similar to that hereinbefore described. However, in this embodiment of the extrusion assembly, water is supplied from the reservoir 241 under pressure into the groove 233 and into continuous contact with the peripheral surface of the charge exposed in the groove 233 to thereby in effect bathe the entire outer periphery of the charge with a relatively thin layer of water as shown in FIGURE 23 as the charge progresses through the die chamber 227. This layer of liquid serves as a lubricant and greatly reduces the frictional forces between the charge and the wall of the die chamber so that considerably less force is required to extrude the charge through the die member 226. Because of the shape of the passage 233 a Venturi effect is created by the periodic movement of the charge across the annular groove 233 to ensure that an adequate layer of water is supplied on all portions of the peripheral surface of the charge as it passes the annular groove. If desired, the die extension 229a can be provided with a chamber with a reverse taper or with an enlarged cross sectional area as hereinbefore described in conjunction with FIGURE 20 to provide additional means for eliminating as much friction as possible by substantially eliminating or reducing all lateral compression forces on the charge in an intermediate portion of the die, i.e., the portion between the extreme entrant and discharge ends of the die.

In addition, I have found that the application of moisture to the outer periphery of the charge in the die facilitates the formation of the bonds as hereinbefore described and thus strengthens and hardens the outer periphery of the wafer. The application of the water first relaxes or releases the adhesives in the hay fragments so that the fragments can be readily flattened and shaped to conform to the die. These adhesives are then rapidly reformed as the moisture is removed to permanently fix the fragments in the new positions. This hardening of the outer periphery particularly enhances the handling characteristics of the wafer.

I have also found that the addition of water to the outer periphery of the wafer helps to conduct heat from the die to the charge to facilitate heating of the outer peripheral margin of the charge to thereby substantially reduce the hold time required for the charge.

By increasing or decreasing the pressure of the water applied to the exterior of the charge by use of the pressure relief valve 243, it is possible to control the depth of penetration of the water into the wafer. It is advantageous to apply moisture to the outer peripheral margin of the charge rather than throughout the hay fragments because this makes it possible to retain the moisture content of the center of the charge at a relatively low valve so that there is no danger of spoilage of the wafers when they are stored. This is also desirable because the center of the charge is therefore less fluid and less likely to exert lateral forces on the die to create additional friction.

It will be noted that the groove 233 has been formed so that it inclined forwardly in the direction of movement of the charge being extruded and that the member 229 is provided with a rounded surface 229b so that the outer peripheral margin of the charge will not be forced upwardly into the groove 233 and clog the groove.

I have found that as the charge progresses through the die, the moisture on the surface of the charge will be vaporized so that near the ejection end, the charge will again have a tendency to stick or adhere to the side walls of the die so that the desired longitudinal compressive forces can be readily obtained by adjustment of the member 206 to vary the cross sectional area of the die.

If desired in order to reduce the friction within the die, the interior of the die can also be coated with a material having a low coefficient of friction as for example a plastic such as Teflon. The use of such a coating may be particularly desirable in the die member 202 in which the charge is being formed. Such coatings may also be desirable on the intermediate portion of the die member.

I have found that the apparatus shown in FIGURE 20 is particularly adapted for making wafers from hay fragments which have a relatively high internal moisture content as for example, a moisture content ranging from 20 to 25 percent. However, in order to utilize this apparatus shown in FIGURE 20 it is desirable to place a plurality of slots or openings within the die extension 203 in the same manner in which such slots or openings 193 are placed in the die shown in FIGURE 17B. The hot air which is utilized for heating the die facilitates the removal of moisture from the charge within the die 203 as the charge progresses through the extrusion die. The moisture as soon as it passes out of the charge through the openings 193 is absorbed by the heated air and passes out of the apparatus with the heated air.

The adjustable member 206 controls the pressure on the charges on the die by laterally compressing the charges as they emerge from the die which in turn places all of the charges in the die under controlled longitudinal compression.

When utilizing hay fragments having a high moisture content it may be more desirable to utilize a die having a reverse taper as hereinbefore described rather than the die with an intermediate portion with a constant cross sectional area throughout its length as shown in FIGURE 20. Thus, if the charge has substantial fluidity, which may be the case with a high moisture content, and the moisture content has not been reduced sufficiently after the charge has passed through the frontal portion of the die 202, the reverse taper will substantially minimize the friction between the die and the charge until the charge passes beyond a point at which the moisture content has been reduced sufficiently to eliminate any substantial lateral expansion of the charge within the die.

I have found that by reducing the moisture content of the hay which forms the charges in the die as described above, the charge becomes more stable. In fact, the charge becomes more and more stable as the moisture content is progressively reduced. This stabilization of the charge occurs because the bonds which are formed as hereinbefore described are more firmly locked. This stabilization of the charges within the die makes it unnecessary to utilize any cooling to stabilize the wafers as they are produced.

Particularly novel feed means for my extrusion apparatus is shown in FIGURES 24–27. It consists of a feed chute which is connected to the cyclone 57 which delivers the hay fragments to the chute. The chute delivers the hay fragments to the upper open end of an impeller housing 247. The upper end of the impeller housing 247 has one side pivotally connected to the chute by a pin.

As impeller 251 is mounted within the housing 247 and consists of a drum 252. The drum 252 is mounted upon a shaft 253 by circular end plates 254. The shaft 253 is rotatably mounted in a pair of side plates 254. A plurality of forwardly curved and spaced tines 256 are mounted on the drum 252 and are adapted to carry hay fragments from the chute 246 and to discharge the hay fragments through elongate spaced slotted openings 257 provided in the lower right hand side of the impeller housing 247 as viewed in FIGURE 25.

The shaft 253 is driven by a pulley 258 which is affixed thereto. The pulley 258 is driven by a belt 259 which is driven by pulley 261. The pulley 261 is mounted on a shaft (not shown) secured to the frame 62. This shaft is driven by another pulley (not shown) which is driven by a belt 264 from suitable drive means (not shown).

The side plates 255 are interconnected by a rod 265. The side plates 255 are also interconnected by a curved plate 266 which is adapted to close the openings 257 as hereinafter described.

The side plates are also provided with stud shafts 267 upon which are rotatably mounted cam followers 268. The cam followers 268 ride in cam tracks 269 provided in rotatable cam members 271. The cam members 271 are fixed on shafts 272 which are rotatably mounted in bearings 273 secured to the frame 62. The shafts 272 are rotated by sprockets 276 secured therto and driven by chains 277 connected to suitable drive means (not shown).

A precompresser or cover plate 281 is associated with each of a plurality of female guide and die members 282. These die members 282 are of a type hereinbefore described and can be of any desired configuration. However, with the arrangement shown, they are preferably rectangular in configuration and have a flat bottom wall 283 and vertical side walls 284 with an open top to form a charge receiving recess 285. The vertical side walls are provided with upwardly extending extensions 284a which are substantially triangular in shape and conform with the movement of the precompresser or cover plates 281 as hereinafter described.

Suitable means is provided for hinging the cover plates 281 at the forward end of the charge receiving recesses and consists of a pin 286 extending through the side walls 284 and overturned portions 281a provided on the cover plates 281. The other end of the precompression member 281 is hinged to the side plates 255 by suitable means such as a pin 287 which extends through the side plates 255 and through underturned portions 281b.

Plungers 292 of the type hereinbefore described are mounted in the female guide and die members 282 for reciprocatory movement for periodically moving material in the recesses 285 into the die chambers 296.

Operation of this feeding apparatus may now be briefly described as follows. Let it be assumed that the apparatus is in the position shown in FIGURE 25 and that hay fragments are rapidly being discharged by the impeller 251 through the openings 257 into the large charge receiving spaces 295 formed between the divider or extension plates 284a, the lower wall of the die 282 and the upwardly inclined cover plates 281. One of these relatively large spaces 295 is provided for each of the charge receiving recesses 285 and the associated die chamber 296.

As hay fragments are being impelled into the spaces 295, the cam members 271 will be operating continuously to begin lowering the upper end of the cover plates 281 by moving the side plates 255 which at the same time cause movement of the impeller 251 and the impeller housing 247 rearwardly about the pivot pin 248 so that the outer ends of the cover plates 281 can readily clear the impeller housing 247.

As the cover plates 281 are moved downwardly they compress the hay fragments into the recesses 285. When the cover plates are lowered into the positions shown in FIGURE 26 they close the upper sides of the recesses 285 to provide four-sided closed chambers formed by the side walls 284, the bottom walls 283 and the cover plates 281 into which the hay fragments have been precompressed. As the cover plates 281 are moved into their lowermost position, the plungers 292 are advanced and are so timed that they enter the recesses 285 to move the precompressed hay fragments into the die chambers 296 in the die members 282. The cam tracks 269 are so shaped that the cover plates 281 remain in their lowermost position until the precompressed hay fragments are forced into the die chambers by the plungers 292 as shown in FIGURE 26.

Thus it can be seen that by precompressing a substantial quantity of hay fragments by use of the precompresser or cover plates 281, relatively large charges can be placed in the compression chambers 296 with each stroke of the plungers 292.

Figure 26:
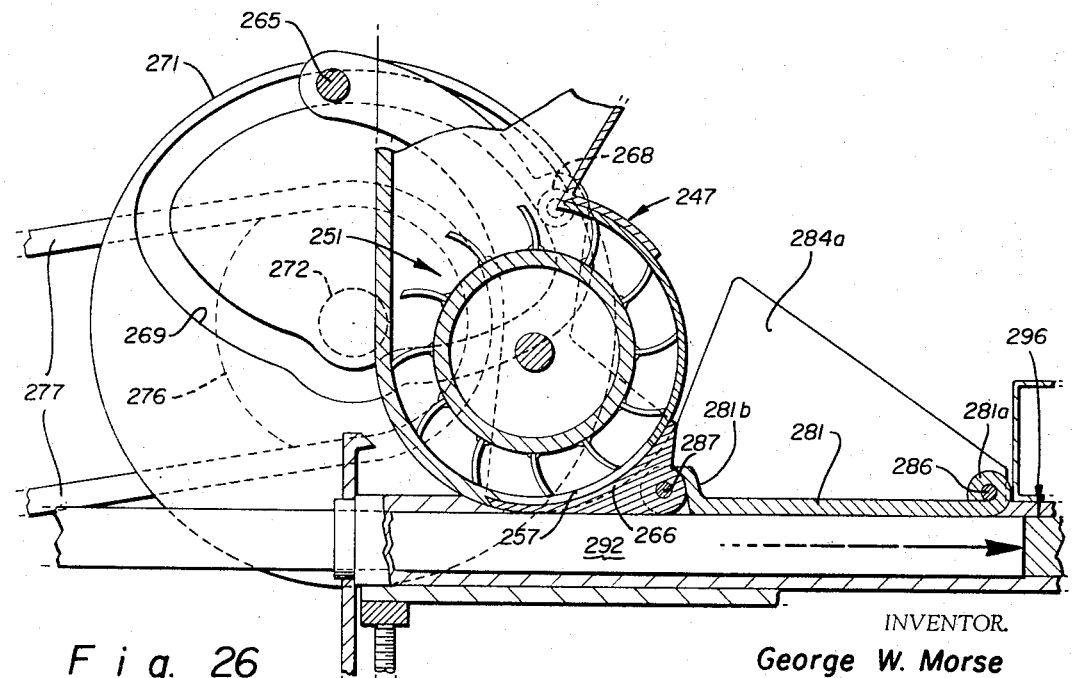
FIGURE 26 is a view similar to FIGURE 25 but showing the relative positions of the feeding assembly when the pistons or plungers are in an extreme forward position.

During the time that the precompresser plates 281 are in a position shown in FIGURE 26, the curved plate 266 is disposed in front of the openings 257 so that hay fragments cannot be discharged by the impeller from the impeller housing 247. However, as soon as the plungers 292 have completed their forward strokes, the cam members 271 are rotated to immediately raise the precompression or cover plates 281 and to remove the curved plate 266 from in front of the openings 257 to again permit hay fragments to be discharged beneath the precompression plates 281 into the spaces 295 as the plungers 292 are being retracted. During the time that the precompresser plates 281 are being moved to their extreme upward position shown in FIGURE 25, the impeller housing 247 and the impeller 251 again swing forwardly to the position shown in FIGURE 25. Continued rotation of the cam members 271 causes the same sequence of operations to take place.

Although I have shown the precompression plates 281 hinged to the die member 282 adjacent the rear ends of the recesses 285, it is readily apparent that if desired, the other ends of the precompresser plates 281 can be hinged to the die member at the rear ends of the recesses 285 and the ends of the plates 281 adjacent the die chambers 296 raised and lowered to receive the hay fragments and then to precompress the hay fragments before they are forced into the die chambers 285 by the plungers 292. In such an arrangement, the impeller 251 and the impeller housing 247 would be positioned over the die chambers 296 to discharge the hay fragments in an opposite direction from that shown in the drawings, that is, in a direction opposite the direction of travel of the plungers when urging the hay fragments into the die chambers 296.

It is apparent from the foregoing that I have provided a new and improved hay wafer which has good keeping qualities and which has excellent handling characteristics. I have also provided a method or process in which the hay wafers can be formed at relatively low pressures and at substantially reduced horse power requirements by the addition of heat to the hay wafers during the time that the hay wafers are being formed. I have also provided a machine or apparatus which makes it possible to conduct wafering or pelleting operations in the field. It is readily apparent, however, that, if desired, the apparatus can be readily modified so that it can be used as stationary apparatus. Also, other materials such as grains and other additives can be added in the apparatus to the chopped hay and formed into the wafers to provide the desired livestock feed.

Although this invention pertains to heating the die to an ideal temperature of approximately 350° F., it should be realized that lower die temperatures in the range of approximately 225 to 250° F. can be used to advantage. Temperatures in this range would not be as effective or rapid in bonding. However, the increased volume of the wafer moisture in vapor form will not be as great at temperatures in this range as it would at higher temperatures. Consequently, vapor pressures tending to push the wafer apart upon discharge of the wafer will not be as great. Nevertheless, the moisture at the periphery must be in the gaseous state for effective removal so temperatures at least as high as 212° F. are required. Generally, a die temperature of at least 225° F. is needed for successful operation so that moisture will vaporize.

Lower die temperatures may be particularly desirable when making smaller wafers or pellets in which a die for this purpose would require a large number of die chambers or holes in order to obtain adequate capacity. A die with a great number of small holes or chambers would make it more difficult to design the die for effective moisture removal and hence it would be preferable to utilize a lower temperature to prevent the building up of vapor pressures which could disrupt the wafers upon discharge. However, with such a lower temperature it normally will be desirable to use higher compression forces. Where the dies can be readily formed to effectively remove substantial amounts of moisture, it is preferable that the dies be formed so that the charge or charges (which also may be called wafers) within the die remain in the die as long as possible at the elevated temperature. This is desirable because the longer the charge is in the die at the elevated temperature, the greater the amount of moisture there is removed from the charge.

Although the apparatus disclosed in this application utilizes reciprocatory motion, it is readily apparent that the same principles can be applied to apparatus utilizing rotary motion or continuous screw action. Also with the various types of apparatus, the size of the wafers or pellets produced can be readily changed by utilizing different sizes of dies.

I claim:

1. In a method for the manufacture of hay wafers or pellets from stem and leaf fragments of dried hay utilizing means forming a die having at least one discharge orifice therein, advancing the stem and leaf fragments of dried hay through the discharge orifice of the die to form the hay wafers or pellets, controlling the advancement of the stem and leaf fragments of dried hay so that a predetermined pressure ranging from 200 to 2000 p.s.i. is applied to the stem and leaf fragments of dried hay before emerging from the discharge orifice in the die, and supplying heat in addition to some heat created by friction to the stem and leaf fragments of dried hay for a period of time ranging from 1 to 120 seconds before they emerge from the discharge orifice of the die so that at least portions of the stem and leaf fragments of dried hay assume a temperature ranging from 212° F. to 350° F. to provide wafers or pellets and having a density between 30 and 40 pounds per cubic foot and to provide wafers which are relatively stable in size and which have good handling characteristics, said application of heat serving to substantially reduce the power required for the manufacture of the hay wafers or pellets.

2. A method as in claim 1 together with the step of supplying water to the outer peripheral surface of the wafer after it has been formed.

3. A method as in claim 2 together with the step of adjusting the pressure of the water to vary the depth of penetration of the water into the charge.

4. A method as in claim 3 wherein the temperature of the interior of the wafer is maintained below 212° F.

5. A method as in claim 1 together with the step of maintaining the desired configuration of the charge by retaining the charge under longitudinal compression while at the same time removing substantially all lateral compression upon the charge for a substantial period of time.

6. A method as in claim 1 together with the step of supplying water to the outer peripheral surface of the wafer.

7. A method as in claim 6 together with the step of adjusting the pressure of the water to vary the depth of penetration of the water into the wafer.

8. In apparatus for the manufacture of hay wafers or pellets from stem and leaf fragments of dried hay, an elongate extrusion die having a passage therein, an extrusion die extension having an additional passage therein in alignment with the passage in the extrusion die, means for advancing charges of stem and leaf fragments of dried hay into the passage in the extrusion die to cause them to be advanced through the extrusion die and into the additional passage in the die extension, means for applying heat to the die and the die extension to cause heat to be supplied to the charges in the extrusion die and the die extension in addition to some heat created by friction between the charges and the die and die extension, and means for applying heat to the means for advancing the charges of stem and leaf fragments of dried hay, said die extension serving to hold the charges in a compressed state during the time that heat is being applied thereto to cause the charges to set up as wafers or pellets in accordance with the conformation of the die extension, said die extension having openings along the length thereof to permit the escape of any excess moisture driven off from the hay by the heat.

9. Apparatus as in claim 8 wherein the die is provided with a plurality of spaced openings spaced along substantially the entire length of the die, said openings being staggered with respect to each other so that substantially all the portions of the die extending longitudinally of the die are provided with said openings.

10. Apparatus as in claim 8 wherein the means for placing charges in the die includes a reciprocable plunger and wherein means is provided for preventing galling of the plunger and the die as the plunger is reciprocated in the die.

11. Apparatus as in claim 10 wherein said means for preventing galling between the plunger and the die chamber consists of a gall inhibiting coating disposed on the plunger.

12. Apparatus as in claim 8 wherein the die is slotted to provide separate die portions and wherein yieldable means is provided for controlling the spacing between the die portions to thereby determine the longitudinal forces of compression required to advance charges into the die.

13. Apparatus as in claim 8 together with means for supplying water to the outer periphery of the charge after it has been formed in the die.

14. Apparatus as in claim 8 wherein the elongate die has a frontal portion having a substantially uniform cross-sectional area throughout its length, an intermediate portion of the die having a size substantially greater than the cross-sectional area of the frontal portion of the die, and adjustable means carried by the discharge portion of the die for reducing the cross-sectional area of the discharge end of the die, means for placing charges of stem and leaf fragments in the die to cause the charge to assume a configuration in accordance with the configuration of the frontal portion of the die, the charges being advanced through the die as additional charges are placed in the die, the friction between the charges and the die being substantially reduced as the charges enter the intermediate portion of the die, said adjustable means being adjusted to have a cross-sectional area less than that of the charge when it leaves the frontal portion of the die to retain the charges under longitudinal compression within the die.

15. Apparatus as in claim 14 together with means for applying water to the outer peripheral surface of the charge while it is under pressure in the die.

16. Apparatus as in claim 14 wherein the means on the discharge end of the die consists of a movable portion forming a portion of the wall of the discharge end of the die, and power activated means for moving the movable portion toward and away from the other portion of the die to increase and decrease the cross-sectional area of the discharge end of the die.

17. Apparatus as in claim 8 together with means forming an open-sided recess associated with the extrusion die for a charge of stem and leaf fragments of dried hay, a reciprocating plunger for advancing the charge in the recess into the die, and means for covering the open side of the recess as the plunger is advanced into the recess to prevent the charge from escaping from the recess.

18. Apparatus as in claim 17 together with means for raising the means for covering the recess away from the recess and means for introducing stem and leaf fragments into the recess when the member for covering the recess is away from the recess.

19. Apparatus as in claim 17 wherein said means for covering the recess includes a member having one end hingedly secured adjacent one end of the recess, means for raising and lowering the other end of the hinged member, and means for depositing stem and leaf fragments into the recess during the time that the means for covering the recess is away from the recess.

20. Apparatus as in claim 8 together with means including a bottom wall and upwardly extending side walls forming a recess for receiving a charge of stem and leaf fragments of dried hay, a reciprocating plunger for advancing the charge in the recess into the die, cover means mounted for movement between the side walls, one end of the cover means being hinged at one end of the recess, means operating in synchronism with said plunger for moving the cover means between a position substantially parallel with the bottom wall and a position inclined with respect to the bottom wall, said means forming the recess and said cover means forming a substantially enclosed relatively large triangularly-shaped space with one open end for the receipt of hay stem and leaf fragments when the cover means is in its inclined position, and means for introducing stem and leaf fragments into the space while the cover means is not in said position substantially parallel to the bottom wall.

21. Apparatus as in claim 20 wherein said means for introducing hay stem and leaf fragments into the space includes a toothed rotating drum.

22. Apparatus as in claim 8 together with means for forming a recess for a charge of stem and leaf fragments of dried hay associated with the die, divider plates extending upwardly from opposite sides of the recess, a cover plate adapted to overlie the recess and to close the recess, means for hinging the cover plate at one end of the recess, a reciprocating plunger for advancing the charge in the recess into the die, cam means for raising and lowering the other end of the cover and operating in synchronism with the plunger so that the cover plate is in a position covering said recess when said plunger is advanced into the recess and a toothed drum for introducing stem and leaf fragments between the cover plate and into the recess when the cover plate is in a position away from the recess.

23. Apparatus as in claim 22 wherein said cam means for raising the cover plate includes means for moving the rotating toothed drum toward and away from the recess as the cover plate is raised and lowered.

24. Apparatus as in claim 8 wherein the extrusion die is cylindrical in cross section and wherein the means for advancing the charge into the die is a cylindrical plunger, said cylindrical die having opposite curved side edges and a forward upper extremity having a knife-like cutting edge so that the fragments of hay extending beyond the sides of the plunger are sheared off so that the hay is introduced into the extrusion die with substantially no lateral compression, portions of the knife-like cutting edge being recessed toward the sides so that the shearing action between the cylindrical plunger and the cylindrical extrusion die will take place during different portions of the stroke of the plunger to thereby reduce the shock forces applied to the plunger.

References Cited

UNITED STATES PATENTS

| 825,957 | 7/1906 | Buckley | 100—179 X |
|---|---|---|---|
| 1,394,458 | 10/1921 | Whitney. | |
| 1,403,294 | 1/1922 | Cowan | 264—124 |
| 2,296,516 | 9/1942 | Goss | 18—5 |
| 2,403,476 | 7/1946 | Berry et al. | 18—8 |
| 2,926,084 | 2/1960 | Geerlings | 99—2 |
| 2,932,571 | 4/1960 | Tribble | 99—2 |
| 2,942,976 | 6/1960 | Kosch | 99—8 |
| 2,995,445 | 8/1961 | Briggs et al. | 99—8 |
| 3,013,880 | 12/1961 | King | 99—8 |
| 3,044,877 | 7/1962 | Lent | 99—8 |

(Other references on following page)

UNITED STATES PATENTS

| | | | |
|---|---|---|---|
| 3,075,456 | 1/1963 | Uschmann | 100—138 |
| 3,090,182 | 5/1963 | Johnson et al. | 56—1 |
| 3,213,783 | 10/1965 | May et al. | 100—100 |

FOREIGN PATENTS 274,687  7/1927  Great Britain.

OTHER REFERENCES

"Proceedings of the 1959 Feed Production School," pp. 180–187 (TS-2158-P4, 1959).

"Agricultural Engineering" magazine, May 1955 S671.A3 pp. 330 and 331 relied on.

"Agricultural Engineering" magazine June 1960, S671.A3, pp. 366–369 relied on.

"Western Crops and Farm Management" magazine, May 1960, page 19 relied on.

McKeon, C. E.: Field Hay Pelleters—Benefits and Problems for presentation at Annual meeting, North Atlantic Section, American Society of Agricultural Engineers, University of Maryland, College Park, Md., Sept. 1–3, 1959.

LOUIS O. MAASSEL, *Primary Examiner.*

UNITED STATES PATENT OFFICE

CERTIFICATE OF CORRECTION

Patent No. 3,352,229                      November 14, 1967

George W. Morse

It is hereby certified that error appears in the above numbered patent requiring correction and that the said Letters Patent should read as corrected below.

Column 22, line 37, for "40" read -- 80 --.

Signed and sealed this 21st day of January 1969.

(SEAL)
Attest:

Edward M. Fletcher, Jr.                      EDWARD J. BRENNER
Attesting Officer                           Commissioner of Patents